United States Patent
Barchers

(10) Patent No.: US 8,853,604 B1
(45) Date of Patent: Oct. 7, 2014

(54) TARGET FEATURE INTEGRATED LASER FIELD CONJUGATION SYSTEM

(76) Inventor: Jeffrey D. Barchers, Boulder, CO (US)

(*) Notice: Subject to any disclaimer, the term of this patent is extended or adjusted under 35 U.S.C. 154(b) by 728 days.

(21) Appl. No.: 12/962,163

(22) Filed: Dec. 7, 2010

Related U.S. Application Data

(60) Provisional application No. 61/285,471, filed on Dec. 10, 2009.

(51) Int. Cl.
*G01J 1/20* (2006.01)

(52) U.S. Cl.
USPC ....... 250/201.9; 356/5.1; 356/5.02; 356/5.03; 356/512; 356/513; 359/331; 359/340; 372/29.016; 372/29.022; 372/29.023; 372/700

(58) Field of Classification Search
USPC ........... 250/201.9, 203.2; 356/5.1, 5.02, 5.03, 356/512, 513; 359/340; 372/29.016, 372/29.022, 29.023, 700
See application file for complete search history.

(56) References Cited

U.S. PATENT DOCUMENTS

| | | | |
|---|---|---|---|
| 4,518,256 A * | 5/1985 | Schwartz | 356/5.03 |
| 4,937,539 A | 6/1990 | Grinberg et al. | |
| 5,088,808 A * | 2/1992 | O'Meara | 359/276 |
| 6,040,857 A | 3/2000 | Hirsh et al. | |
| 6,115,123 A | 9/2000 | Stappaerts et al. | |
| 6,452,146 B1 | 9/2002 | Barchers | |
| 6,683,291 B2 | 1/2004 | Barchers | |
| 6,957,099 B1 | 10/2005 | Arnone et al. | |
| 7,038,791 B2 | 5/2006 | Smith | |
| 7,333,215 B2 | 2/2008 | Smith | |
| 7,402,785 B2 | 7/2008 | Barchers | |
| 7,405,834 B1 | 7/2008 | Marron et al. | |
| 7,656,539 B1 | 2/2010 | Lee | |
| 8,076,624 B1 | 12/2011 | Barchers et al. | |
| 8,265,375 B2 | 9/2012 | Shirley | |
| 2003/0062468 A1* | 4/2003 | Byren et al. | 250/216 |
| 2004/0069927 A1* | 4/2004 | Billman | 250/206.1 |
| 2005/0006559 A1 | 1/2005 | Smith | |
| 2005/0015233 A1 | 1/2005 | Gordon | |
| 2006/0022115 A1* | 2/2006 | Byren | 250/201.9 |
| 2006/0049331 A1 | 3/2006 | Smith | |
| 2008/0042042 A1* | 2/2008 | King et al. | 250/201.9 |

* cited by examiner

*Primary Examiner* — Seung C Sohn
*Assistant Examiner* — Kevin Wyatt
(74) *Attorney, Agent, or Firm* — Patent Law Offices of Rick Martin, P.C.

(57) ABSTRACT

An Integrated Laser Field Conjugation System (ILFCS) for end-to-end compensation of high-energy laser for propagation through turbulence with non-cooperative target. ILFCS using interferometric slaving technique and stand-alone adaptive optical systems to effect pre-compensation of amplitude and phase aberrations in turbulent medium, providing pre-compensation for aberrations in a laser amplifier. Performing compensation functions in low-power beam paths, increasing capability, reducing cost, reducing size compensation components for phase correction devices. Pre-compensating low-power master oscillator beam for aberrations in both high-power amplifier and turbulent propagation path-to-target with configuration enabling wavefront sensing of aberrations. Can be configured to perform phase compensation, or compensation of phase/amplitude aberrations. Capability to compensate aberrations in master oscillator beam. ILFCS enables integration with a short pulse mode locked laser for use in Target Feature Adaptive Optics (TFAO) or with a mode locked ultra short pulse laser with carrier envelope phase stabilization for use in Broadband Coherent Adaptive Optics (BCAO).

27 Claims, 13 Drawing Sheets

TARGET FEATURE INTEGRATED LASER FIELD CONJUGATION SYSTEM

CROSS REFERENCE APPLICATIONS

This application is a non-provisional application claiming the benefits of provisional application No. 61/285,471 filed Dec. 10, 2009.

This invention was made with Government support under Contract FA9451-09-C-0001 and FA9451-09-C-0009 awarded by the United States Air Force. The government has certain rights in the invention.

STATEMENT REGARDING FEDERALLY SPONSORED RESEARCH OR DEVELOPMENT

The U.S. Air Force Research Laboratory of the U.S. Government has a license in this invention under the terms as provided for by Contract No. FA9451-11-C-0193.

FIELD OF INVENTION

The present invention relates to a method and several system implementations for projection of laser beams through a turbulent medium with a non-cooperative target using a combination of an adaptive optical system and a transform limited short pulse laser source to form a controllable focused laser beacon at the target. A non-cooperative target refers to a target in which no laser beacon is provided directly by the target for wavefront sensing.

BACKGROUND OF THE INVENTION

Adaptive optical system technology has found a wide range of applications including astronomical imaging and long-range free space optical communication. Adaptive optical system technology can potentially enhance any application in which turbulence along the path, which leads to refractive index fluctuations due to temperature variations, degrades the performance of an imaging or laser projection system. Prior art methods are well known for dealing with great distances and associated phenomena of strong scintillation (wherein branch points in the phase function begin to dominate performance and amplitude fluctuations can begin to degrade performance). See references below. (1; 2; 3; 4; 5; 6; 7; 8; 9; 10). These methods suffer from two important limitations that prevent ready application for higher energy laser and directed energy applications: (1) a requirement that the phase correction device be capable of operating with a high power laser; and (2) significantly reduced effectiveness with a non-cooperative target [with the method described in reference 9 below being an exception].

On the topic of the first limitation—that the phase correction device be capable of operation with a high power laser—there are two driving issues at hand. The first driving issue is that the coating technology used to enable highly reflective coatings is at odds with the need to make the facesheet of the phase correction device very thin to enable rapid and effective correction of aberrations. The stress induced by the highly reflective coating utilized to prevent thermal induced aberrations in the correction device can lead to such strong aberrations that the phase correction device is rendered un-usable. However, if a more conventional low stress coating is utilized the thermal aberrations in the phase correction device can render the phase correction device un-usable. The second driving issue is that the difficulties associated with coating the phase correction device are typically alleviated by making the high power beam path physically larger to reduce the power density on the phase correction device. This has many consequences and as the beam path grows in size the total size of the system grows tremendously, leading to very heavy systems whose size is un-necessarily larger to accommodate an adaptive optical system. A method that could avoid compensation in the high power beam path and perform all higher order correction functions in a low power beam path would have great benefit for a broad range of applications including long range laser radar, laser range-finding, and directed energy—these applications would become viable if high performance small size correction devices could be utilized.

On the topic of the second limitation—that the vast majority of methods are not effective with non-cooperative targets—there has been some recent headway made against this problem (see reference 9; 11), however the practical implementation of such methods remains challenging. In the typical/ideal scenario, a cooperative point source beacon projected from the target is used to make wavefront sensing measurements of the distortions along the path for pre-compensation of a laser beam by the adaptive optical system. However, many potential applications of adaptive optical systems, including laser radar, laser range finding, directed energy, and ophthalmic imaging all have "non-cooperative" targets. In the non-cooperative target case, no laser beacon is available from the target except that obtained from back-scattered radiation from the target itself or from the atmosphere (laser guide star obtained from Rayleigh or Mie light scattering). Many fundamental challenges exist in the case of a non-cooperative target. Overcoming these challenges would have significant benefit for many applications and open up the enabling capability for adaptive optical systems to new regimes and applications.

What is needed is a method for simultaneous compensation of aberrations in a high energy laser and for propagation through a turbulent medium with a cooperative or non-cooperative target. The present invention meets these needs by providing a method offering tremendous potential improvements both in terms of performance enhancements with non-cooperative targets and in reduction in size, weight, and power of a high energy laser system due to reductions in size, weight, and complexity of the beam control system.

U.S. patent application Ser. No. 12/234,041 filed Sep. 19, 2008 is fully incorporated herein by reference and provides a wavefront sensing and control technique to measure the aberrations along the propagation path using return from an ultra-short coherence length laser forming a controllable focused laser beacon at a non-cooperative target, regardless of the surface depth of the target. The present invention provides for an alternate but similar method for wavefront sensing and control using return from lasers with a short, but not necessarily ultra-short pulse, where the requirement for the pulse and corresponding coherence length is based on the target shape and orientation.

REFERENCES

1. *Evaluation of phase-shifting approaches for a point-diffraction interferometer with the mutual coherence function.* Barchers, J. D. and Rhoadarmer, T. A. December 2002, Applied Optics, Vol. 41, pp. 7499-7509.
2. *Improved compensation of amplitude and phase fluctuations by means of multiple near field phase adjustments.* Barchers, J. D. and Ellerbroek, B. L. February 2001, Journal of the Optical Society of America A, Vol. 18, pp. 399-411.

3. *Closed loop stable control of two deformable mirrors for compensation of amplitude and phase fluctuations.* Barchers, J. D. 2002, Journal of the Optical Society of America A, Vol. 19, pp. 926-945.
4. *Evaluation of the impact of finite resolution effects on scintillation compensation using two deformable mirrors.* Barchers, J. D. 2001, Journal of the Optical Society of America A, Vol. 18, pp. 3098-3109.
5. *Optimal control of laser beams for propagation through a turbulent medium.* Barchers, J. D. and Fried, D. L. September 2002, Journal of the Optical Society of America A., Vol. 19, pp. 1779-1793.
6. Barchers, J. D. Optimal beam propagation system having adaptive optical systems. U.S. Pat. No. 6,638,291 U.S.A., Jan. 27, 2004.
7. —. Electro-optical field conjugation system. U.S. Pat. No. 6,452,146 U.S.A., Sep. 17, 2002.
8. —. Non-cooperative laser target enhancement system and method. application Ser. No. 12/234,041 U.S.A., Sep. 19, 2008.
9. *Noise analysis for complex field estimation using a self-referencing interferometer wavefront sensor.* Rhoadarmer, T. A. and Barchers, J. D. 2002, Proc. SPIE, Vol. 4825, pp. 215-227.
10. Barchers, J. D. System and method for correction of turbulence effects on laser or other transmission. U.S. Pat. No. 7,402,785 U.S.A., Jul. 22, 2008.
11. Belenkii, M. S. Beaconless adaptive optics system. application Ser. No. 12/157,014 U.S.A., Jun. 6, 2008.
12. *Modeling of laser beam control systems using projections onto constraint sets.* Barchers, J. D. 2004. American Control Conference.

SUMMARY OF THE INVENTION

The primary aspect of the present invention is to provide an integrated laser field conjugation system method to measure and correct for aberrations in both a laser amplifier or laser resonator.

Another aspect of the present invention is to provide for propagation through turbulence utilizing phase correction devices that are only in low power beam paths, greatly reducing the size, weight, power, and complexity of a directed energy system, regardless of the application.

Another aspect of the present invention is to provide a method for the ability to form a narrowly focused beam at the target that can be used for high quality wavefront sensing measurements.

Yet another aspect of the present invention is to provide a method for a narrowly focused sensing beam at the target that provides the optimal approach for wavefront sensing utilizing heterodyne detection to minimize the wavefront sensing error due to detector noise.

Another aspect of the present invention is to provide a method for sensing and pre-compensation of laser aberrations by having a beam path for imaging, tracking, and aim-point maintenance/control that is not corrupted by aberrations from atmospheric turbulence.

Another aspect of the present invention is to provide a method such that the compensation for laser aberrations does not corrupt the imagery.

Other aspects of this invention will appear from the following description and appended claims, reference being made to the accompanying drawings forming a part of this specification wherein like reference characters designate corresponding parts in the several views.

The present invention provides a method for pre-compensation of aberration in the laser gain medium, including potential methods for integration with high energy lasers in both a master oscillator power amplifier and unstable resonator configuration. These methods include means for joint pre-compensation of aberrations focusing less on the description of the method for obtaining a high quality wavefront sensing beacon. The present invention also provides methods for compensation with a non-cooperative target by obtaining a high quality wavefront sensing beacon beam at the target. Numerical results demonstrating the effectiveness of the method and a summary of the potential benefits will be described below.

A summary of the present invention can also be described with reference to the Figures below. The summary consisting of the following:

1. (FIGS. 6, 9A, 9B, and 12) An electro-optical system for projection of laser beams through a turbulent medium to a non-cooperative target, the system comprising:
   a) a master oscillator beam having an optical path to an amplifier means;
   b) said amplifier means forming a high energy laser (HEL) beam to a target via an optical path;
   c) said optical path including a steering mirror and a telescope;
   d) a mode locked beacon master oscillator that produces a majority beacon beam comprising a high repetition rate (ranging from about 100 to 100000 Hz) sequence of transform limited pulsed laser beams and producing a minority reference beam that has a repetition rate defined by the cavity length of the mode locked beacon master oscillator (ranging typically from MHz to GHz);
   e) wherein a timing delay circuit receives the minority reference beam and produces a delayed reference beam that is delayed to coincide with the arrival of a return beacon beam from a target aimpoint along a propagation path axis;
   f) said majority beacon beam transmitted via an optical path to a medium power amplifier which sends the majority beacon beam via an optical path to the target;
   g) wherein a return beacon beam comprising a high repetition rate pulse train beam returns from the target through the turbulent medium, telescope, optical path, and a quarter waveplate in the optical path, then passes through a first polarizing beam splitter optic;
   h) wherein the return beacon beam is then directed to a first beacon wave front sensor (WFS) where it is combined with the minority reference beam to form a composite beam for phase measurement;
   i) said first WFS controlling a first phase correction and steering device pair which (1) corrects the majority beacon beam with respect to phase aberrations caused by propagation through the turbulent medium and (2) provides phase commands to the first phase correction and steering device pair that will result in correction of amplitude aberrations in the beacon beam caused by propagation through the turbulent medium;
   j) a tracker and aim point controller which receives an image of the target from an illumination source, thereby generating a control signal to control the steering mirror;
   k) said minority reference beacon beam further comprising a sample which goes to a second beacon WFS which also receives a sample of the return beacon beam after said return beacon beam passes through a further propagation optics and a third and second correction and steering device pair;

l) said second beacon WFS controlling a third correction and steering device pair which corrects for remaining aberrations in the return beacon beam, resulting in correction of both amplitude and phase aberrations caused by propagation through the turbulent medium;

m) a third WFS receives a sample beam from the minority master oscillator beam after it passes through a spatial filter optic and the fourth correction and steering device pair to compare to a sample of the majority master oscillator beam after it passes through an optical path including a propagation optics and the third correction and steering device pair;

n) said third WFS controlling a fourth correction and steering device pair to correct for aberrations induced by propagation through the third phase correction and steering device pair and propagation optics;

j) a fourth WFS receiving a sample of the majority master oscillator beam and a minority master oscillator beam after it passes through a spatial filter optic and the second correction and steering device pair;

p) said fourth WFS controlling a second phase correction and steering device pair to correct for aberrations in the master oscillator;

q) a fifth WFS receiving a HEL amplifier probe beam after it passes through the amplifier means; and r) said fifth WFS controlling a fifth correction and steering device pair.

2. The system of claim 1, wherein the first and fourth pair of phase correction and steering device pairs are about optically conjugate to one another.

3. The system of claim 1, wherein the second and third pair of phase correction and steering device pairs are about optically conjugate to one another.

4. The system of claim 1, wherein the second and third pair of phase correction and steering device pairs have a free space propagation distance (from the conjugate plane of the first and fourth phase correction and steering device pairs) of approximately:

$$-D^2/\lambda N$$

where D is the beam size, $\lambda$ is the wavelength and N is the number of phase correction device actuator spacings across the beam.

5. The system of claim 1, wherein the beacon beam is formed as a cooperative beacon located at the target and pointed toward the transmitting HEL optical path.

6. The system of claim 1, wherein the beacon beam is formed as an illuminator beam launched from an auxiliary telescope to illuminate the target, and the reflection from the target serves as the beacon beam.

7. The system of claim 1, wherein the beacon beam is a solar illumination of the target.

8. The system of claim 1, wherein the beacon beam is a thermal emission of the target.

9. The system of claim 1, wherein the amplifier means is an injection locked laser resonator.

10. The system of claim 1, wherein the image of the target is formed as a cooperative beacon located at the target and pointed toward the transmitting HEL optical path.

11. The system of claim 1, wherein the image of the target received by the aim point controller is either a passive or active illumination of the target.

12. The system of claim 1, wherein a sixth WFS receives a beacon amplifier probe beam after it passes through a beacon medium power amplifier and also receives a sample beam from the beacon amplifier probe beam.

13. The system of claim 12, wherein the sixth WFS controls a sixth correction and steering device pair.

14. The system of claim 1, wherein the amplifier means is a high power laser amplifier.

15. The system of claim 1, wherein the amplifier means is an injection locked laser amplifier.

16. The electro-optical system of claim 1, wherein a first part of the composite beam is directed to an about half waveplate that rotates the polarization of the composite beam by about 45 degrees and then to a polarizing beam splitter that directs the resultant interference patterns to a first and second camera with the resulting measurements being used to compute an estimate of a real part of a measured complex field of the return beacon beam.

17. The electro-optical system of claim 1, wherein a second part of the composite beam is directed first to an about quarter waveplate with its crystal axis approximately aligned to the polarization axis of the minority reference beam and then to an about half waveplate that rotates the polarization of the composite beam by about 45 degrees and then to a polarizing beam splitter that directs the resultant interference patterns to a third and fourth camera with the resulting measurements being used to compute an estimate of an imaginary part of a measured complex field of the return beacon beam.

18. The electro-optical system of claim 1, wherein the minority reference beam and the return beacon beam are at about orthogonal polarizations to one another.

19. The electro-optical system of claim 1, wherein the first and second WFS consists of a an about $\pi/3$ waveplate, an about $5/3\pi$ waveplate, and a $\pi$ waveplate each associated with a separate camera and can be aligned approximately to the minority reference beam polarization state.

20. (FIG. 9A, 9B,12) An electro-optical system for measurement of aberrations induced on a laser beam by propagation through a turbulent medium to a non-cooperative target, the system comprising:

a) a mode locked beacon master oscillator that produces a majority beacon beam comprising a high repetition rate (ranging from about 100 to 100000 Hz) sequence of transform limited pulsed laser beams and producing a minority reference beam that has a repetition rate defined by the cavity length of the mode locked beacon master oscillator (ranging typically from MHz to GHz);

b) wherein a timing delay circuit receives the minority reference beam and produces a delayed reference beam delayed to coincide with an arrival time of a return beacon beam from a target aimpoint along a propagation path axis;

c) wherein the majority beacon beam is transmitted through an optical path through a telescope, and through the turbulent medium to a target;

d) wherein the return beacon beam returns from the target through the turbulent medium, telescope, optical path, and a quarter waveplate in the optical path, then passes through a first polarizing wave splitter optic; and e) wherein the return beacon beam is then directed to a wave front sensor (WFS) where it is combined with the minority reference beam to form a composite beam for phase measurement.

21. The electro-optical system of claim 20, wherein a first part of the composite beam is directed to a an about half waveplate that rotates the polarization of the composite beam by about 45 degrees and then to a polarizing beam splitter that directs the resultant interference patterns to a first and second camera with the resulting measurements being used to compute an estimate of a real part of a measured complex field of the return beacon beam.

22. The electro-optical system of claim 20, wherein a second part of the composite beam is directed first to a quarter waveplate with its crystal axis approximately aligned to the polarization axis of the minority reference beam and then to an about half waveplate that rotates the polarization of the composite beam by about 45 degrees and then to a polarizing beam splitter that directs the resultant interference patterns to a third and fourth camera with the resulting measurements being used to compute an estimate of an imaginary part of a measured complex field of the return beacon beam.

23. The electro-optical system of claim 20, wherein the minority reference beam and the return beacon beam are at about orthogonal polarizations to one another.

24. The electro-optical system of claim 20, wherein the WFS consists of an about $\pi/3$ waveplate, an about $5/3\pi$ waveplate, and a $\pi$ waveplate each associated with a separate camera and can be aligned approximately to the minority reference beam polarization state.

25. (FIGS. 1, 9A, 9B, and 12, with an aspect of 8—the approach for wavefront measurement with a non-cooperative target) An electro-optical system for projection of laser beams through a turbulent medium to a non-cooperative target, the system comprising:
   a) a master oscillator beam having an optical path to an amplifier means;
   b) said amplifier means forming a high energy laser (HEL) beam to a target via an optical path;
   c) said optical path including a steering mirror and a telescope;
   d) a mode locked beacon master oscillator that produces a majority beacon beam comprising a high repetition rate (ranging from about 100 to 100000 Hz) sequence of transform limited pulsed laser beams and producing a minority reference beam that has a repetition rate defined by the cavity length of the mode locked beacon master oscillator (ranging typically from MHz to GHz);
   e) wherein a timing delay circuit receives the minority reference beam and produces a delayed reference beam that is delayed to coincide with an arrival of a return beacon beam from a target aimpoint along a propagation path axis;
   f) said majority beacon beam transmitted via an optical path to a medium power amplifier which sends the majority beacon beam via an optical path to the target;
   g) wherein a return beacon beam comprising a high repetition rate pulse train beam returns from the target through the turbulent medium, telescope, optical path, and a quarter waveplate in the optical path, then passes through a first polarizing wave splitter optic;
   h) wherein the return beacon beam is then directed to a first beacon wave front sensor (WFS) where it is combined with the minority reference beam to form a composite beam for phase measurement;
   i) said first WFS controlling a first phase correction and steering device pair which (1) corrects the majority beacon beam with respect to phase aberrations caused by propagation through the turbulent medium and (2) provides phase commands to the first phase correction and steering device pair that will result in correction of amplitude aberrations in the beacon beam caused by propagation through the turbulent medium;
   j) a tracker and aim point controller which receives an image of the target from an illumination source to generate a control signal to control a steering mirror;
   k) a third WFS receives a sample beam from the minority reference beam after it passes through a spatial filter optic and the fourth correction and steering device pair to compare to a sample of the majority beacon beam after it passes through an optical path including a propagation optics and the third correction and steering device pair;
   l) said third WFS also receives a HEL amplifier probe beam after it passes through the amplifier means to interfere with a sample probe beam from the HEL amplifier probe; and
   m) said third WFS controlling a fourth correction and steering device pair to correct for aberrations in the master oscillator and amplifier means.

26. The system of claim 25, wherein the first and fourth pair of phase correction and steering device pairs are about optically conjugate to one another.

27. The system of claim 25, wherein the return beacon beam is formed as a cooperative beacon located at the target and pointed toward the transmitting HEL optical path.

28. The system of claim 25, wherein the return beacon beam is formed as an illuminator beam launched from an auxiliary telescope to illuminate the target, and the reflection from the target serves as the beacon beam.

29. The system of claim 25, wherein the return beacon beam is a solar illumination of the target.

30. The system of claim 25, wherein the return beacon beam is a thermal emission of the target.

31. The system of claim 25, wherein the amplifier means is injection locked laser resonator.

32. The system of claim 25, wherein the image of the target is formed as a cooperative beacon located at the target and pointed toward the transmitting HEL optical path.

33. The system of claim 25, wherein the image of the target received by the aim point controller is either a passive or active illumination of the target.

34. The system of claim 25, wherein a sixth WFS receives a beacon amplifier probe beam after it passes through a beacon medium power amplifier and also receives a sample beam from the beacon amplifier probe beam.

35. The system of claim 25, wherein the sixth WFS controls a sixth correction and steering device pair.

36. The system of claim 25, wherein the amplifier means is a high power laser amplifier.

37. The system of claim 25, wherein the amplifier means is an injection locked laser amplifier.

38. The electro-optical system of claim 25, wherein a first part of the composite beam is directed to a an about half waveplate that rotates the polarization of the composite beam by about 45 degrees and then to a polarizing beam splitter that directs the resultant interference patterns to a first and second camera with the resulting measurements being used to compute an estimate of a real part of a measured complex field of the return beacon beam.

39. The electro-optical system of claim 25, wherein a second part of the composite beam is directed first to a quarter waveplate with its crystal axis approximately aligned to the polarization axis of the minority reference beam and then to an about half waveplate that rotates the polarization of the composite beam by about 45 degrees and then to a polarizing beam splitter that directs the resultant interference patterns to a third and fourth camera with the resulting measurements being used to compute an estimate of an imaginary part of a measured complex field of the return beacon beam.

40. The electro-optical system of claim 25, wherein the minority reference beam and the return beacon beam are at about orthogonal polarizations to one another.

41. The electro-optical system of claim 25, wherein the first WFS consists of an about $\pi/3$ waveplate, an about $5/3\pi$ waveplate, and an about $\pi$ waveplate each associated with a separate camera and can be aligned approximately to the minority reference beam polarization state.

42. (FIG. 8) An electro-optical system for projection of laser beams through a turbulent medium to a non-cooperative target, the system comprising:
   a) a master oscillator beam having an optical path to an amplifier means;
   b) said amplifier means forming a high energy laser (HEL) beam to a target via an optical path;
   c) said optical path including a steering mirror and a telescope;
   d) a mode locked beacon master oscillator that produces a majority beacon beam comprising a high repetition rate (ranging from about 100 to 100000 Hz) sequence of transform limited pulsed laser beams and producing a minority reference beam that has a repetition rate defined by the cavity length of the mode locked beacon master oscillator (ranging typically from MHz to GHz);
   e) wherein a timing delay circuit receives the minority reference beam and produces a delayed reference beam that is delayed to coincide with the arrival of a return beacon beam from a target aimpoint along a propagation path axis;
   f) said majority beacon beam transmitted via an optical path to a medium power amplifier which sends the majority beacon beam via an optical path to the target;
   g) wherein a return beacon beam comprising a high repetition rate pulse train beam returns from the target through the turbulent medium, telescope, optical path, and a quarter waveplate in the optical path, then passes through a first polarizing wave splitter optic;
   h) wherein the return beacon beam is then directed to a first beacon wave front sensor (WFS) where it is combined with the minority reference beam to form a composite beam for phase measurement;
   i) said first WFS controlling a first phase correction and steering device pair which corrects the majority beacon beam with respect to phase aberrations caused by propagation through the turbulent medium;
   j) a tracker and aim point controller which receives an image of the target from an illumination source, thereby generating a control signal to control the steering mirror;
   k) a third WFS (no second WFS is named) receives a sample beam from the minority master oscillator beam after it passes through a spatial filter optic and the fourth correction and steering device pair to compare to a sample of the majority master oscillator beam after it passes through an optical path including a propagation optics and the third correction and steering device pair;
   l) said third WFS controlling a fourth correction and steering device pair to correct for aberrations induced by propagation through the third phase correction and steering device pair and propagation optics;
   m) a fifth WFS (no fourth WFS is named) receiving a HEL amplifier probe beam after it passes through the amplifier means; and
   n) said fifth WFS controlling a fifth correction and steering device pair.

43. The system of claim 42, wherein the first and fourth pair of phase correction and steering device pairs are about optically conjugate to one another.

44. The system of claim 42, wherein the beam sampling optic is highly transmissive at the beacon wavelength and receive polarization, and is highly reflective at the beacon wavelength and transmit polarization, and is highly reflective at the HEL wavelength at both polarizations.

45. The system of claim 42, wherein the return beacon beam is formed as a cooperative beacon located at the target and pointed toward the transmitting HEL optical path.

46. The system of claim 42, wherein the return beacon beam is formed as an illuminator beam launched from an auxiliary telescope to illuminate the target, and the reflection from the target serves as the beacon beam.

47. The system of claim 42, wherein the return beacon beam is a solar illumination of the target.

48. The system of claim 42, wherein the return beacon beam is a thermal emission of the target.

49. The system of claim 42, wherein the amplifier means is replaced with an injection locked laser resonator.

50. The system of claim 42, wherein the image of the target is formed as a cooperative beacon located at the target and pointed toward the transmitting HEL optical path.

51. The system of claim 42, wherein the image of the target received by the aim point controller is either a passive or active illumination of the target.

52. The system of claim 42, wherein a sixth WFS receives a beacon amplifier probe beam after it passes through a beacon medium power amplifier and also receives a sample beam from the beacon amplifier probe beam.

53. The system of claim 42, wherein the sixth WFS controls a sixth correction and steering device pair.

54. The system of claim 42, wherein the amplifier means is a high power laser amplifier.

55. The system of claim 42, wherein the amplifier means is an injection locked laser amplifier.

56. The electro-optical system of claim 42, wherein a first part of the composite beam is directed to an about half waveplate that rotates the polarization of the composite beam by about 45 degrees and then to a polarizing beam splitter that directs the resultant interference patterns to a first and second camera with the resulting measurements being used to compute an estimate of a real part of a measured complex field of the return beacon beam.

57. The electro-optical system of claim 42, wherein a second part of the composite beam is directed first to an about quarter waveplate with its crystal axis approximately aligned to the polarization axis of the minority reference beam and then to an about half waveplate that rotates the polarization of the composite beam by 45 degrees and then to a polarizing beam splitter that directs the resultant interference patterns to a third and fourth camera with the resulting measurements being used to compute an estimate of an imaginary part of a measured complex field of the return beacon beam.

58. The electro-optical system of claim 42, wherein the minority reference beam and the return beacon beam are at about orthogonal polarizations to one another.

59. The electro-optical system of claim 42, wherein the first WFS consists of an about $\pi/3$ waveplate, an about $5/3\pi$ waveplate, and an about $\pi$ waveplate each associated with a separate camera and can be aligned approximately to the minority reference beam polarization state.

60. (FIG. 7) An electro-optical system for projection of laser beams through a turbulent medium to a non-cooperative target, the system comprising:
   a) a master oscillator beam having an optical path to an amplifier means;
   b) said amplifier means forming a high energy laser (HEL) beam to a target via an optical path;
   c) said optical path including a steering mirror and a telescope;
   d) a mode locked beacon master oscillator that produces a majority beacon beam comprising a high repetition rate (ranging from about 100 to 100000 Hz) sequence of transform limited pulsed laser beams and producing a minority reference beam that has a repetition rate defined by the cavity length of the mode locked beacon master oscillator (ranging typically from MHz to GHz);

e) wherein a timing delay circuit receives the minority reference beam and produces a delayed reference beam that is delayed to coincide with the arrival of a return beacon beam from a target aimpoint along a propagation path axis;

f) said majority beacon beam transmitted via an optical path to a medium power amplifier which sends the majority beacon beam via an optical path to the target;

g) wherein a return beacon beam comprising a high repetition rate pulse train beam returns from the target through the turbulent medium, telescope, optical path, and a quarter waveplate in the optical path, then passes through a first polarizing wave splitter optic;

h) wherein the return beacon beam is then directed to a first beacon wave front sensor (WFS) where it is combined with the minority reference beam to form a composite beam for phase measurement;

i) said first WFS controlling a first phase correction and steering device pair which (1) corrects the majority beacon beam with respect to phase aberrations caused by propagation through the turbulent medium and (2) provides phase commands to the first phase correction and steering device pair that will result in correction of amplitude aberrations in the beacon beam caused by propagation through the turbulent medium;

j) a tracker and aim point controller which receives an image of the target from an illumination source, thereby generating a control signal to control the steering mirror;

k) a third WFS (no second WFS is named) receives a sample beam from the minority master oscillator beam after it passes through a spatial filter optic and the fourth correction and steering device pair to compare to a sample of the majority master oscillator beam after it passes through an optical path including a propagation optics and the third correction and steering device pair (no second correction and steering device par is named);

l) said third WFS controlling a fourth correction and steering device pair to correct for aberrations induced by propagation through the third phase correction and steering device pair and propagation optics;

m) a fifth WFS receiving a HEL amplifier probe beam after it passes through the amplifier means; and n) said fifth WFS controlling a fifth correction and steering device pair.

61. The system of claim 60, wherein the first and fourth pair of phase correction and steering device pairs are about optically conjugate to one another.

62. The system of claim 60, wherein the third pair of phase correction and steering device pairs have a free space propagation distance (from the conjugate plane of the first and fourth phase correction and steering device pairs) of approximately:

$$-D^2/\lambda N$$

where D is the beam size, $\lambda$ is the wavelength and N is the number of phase correction device actuator spacings across the beam.

63. The system of claim 60, wherein the beacon beam is formed as a cooperative beacon located at the target and pointed toward the transmitting HEL optical path.

64. The system of claim 60, wherein the beacon beam is formed as an illuminator beam launched from an auxiliary telescope to illuminate the target, and the reflection from the target serves as the beacon beam.

65. The system of claim 60, wherein the beacon beam is a solar illumination of the target.

66. The system of claim 60, wherein the beacon beam is a thermal emission of the target.

67. The system of claim 60, wherein the amplifier means is an injection locked laser resonator.

68. The system of claim 60, wherein the image of the target is formed as a cooperative beacon located at the target and pointed toward the transmitting HEL optical path.

69. The system of claim 60, wherein the image of the target received by the aim point controller is either a passive or active illumination of the target.

70. The system of claim 60, wherein a sixth WFS receives a beacon amplifier probe beam after it passes through a beacon medium power amplifier and also receives a sample beam from the beacon amplifier probe beam.

71. The system of claim 70, wherein the sixth WFS controls a sixth correction and steering device pair.

72. The system of claim 60, wherein the amplifier means is a high power laser amplifier.

73. The system of claim 60, wherein the amplifier means is an injection locked laser amplifier.

74. The electro-optical system of claim 60, wherein a first part of the composite beam is directed to an about half waveplate that rotates the polarization of the composite beam by about 45 degrees and then to a polarizing beam splitter that directs the resultant interference patterns to a first and second camera with the resulting measurements being used to compute an estimate of a real part of a measured complex field of the return beacon beam.

75. The electro-optical system of claim 60, wherein a second part of the composite beam is directed first to an about quarter waveplate with its crystal axis approximately aligned to the polarization axis of the minority reference beam and then to an about half waveplate that rotates the polarization of the composite beam by about 45 degrees and then to a polarizing beam splitter that directs the resultant interference patterns to a third and fourth camera with the resulting measurements being used to compute an estimate of an imaginary part of a measured complex field of the return beacon beam.

76. The electro-optical system of claim 60, wherein the minority reference beam and the return beacon beam are at about orthogonal polarizations to one another.

77. The electro-optical system of claim 60, wherein the first and second WFS consists of an about $\pi/3$ waveplate, an about $5/3\pi$ waveplate, and an about $\pi$ waveplate each associated with a separate camera and can be aligned approximately to the minority reference beam polarization state.

78. (Variation of FIG. 8) An electro-optical system for projection of laser beams through a turbulent medium to a non-cooperative target, the system comprising:

a) a master oscillator beam having an optical path to an amplifier means;

b) said amplifier means forming a high energy laser (HEL) beam to a target via an optical path;

c) said optical path including a steering mirror and a telescope;

d) a mode locked beacon master oscillator that produces a majority beacon beam comprising a high repetition rate (ranging from about 100 to 100000 Hz) sequence of transform limited pulsed laser beams (a beacon beam) and producing a minority reference beam that has a repetition rate defined by the cavity length of the mode locked beacon master oscillator (ranging typically from MHz to GHz);

e) wherein a timing delay circuit receives the minority reference beam and produces a delayed reference beam that is delayed to coincide with the arrival of a return beacon beam from a target aimpoint along a propagation path axis;

f) said majority high repetition rate beacon beam transmitted via an optical path to a medium power amplifier which sends the majority beacon beam via an optical path to the target;

g) wherein a return beacon beam comprising a high repetition rate pulse train beam returns from the target through the turbulent medium, telescope, optical path, and a quarter waveplate in the optical path, then passes through a first polarizing wave splitter optic;

h) wherein the return beacon beam is then directed to a first beacon wave front sensor (WFS) where it is combined with the minority reference beam to form a composite beam for phase measurement;

i) said first WFS controlling a first phase correction and steering device pair which corrects the beacon beam with respect to phase aberrations caused by propagation through the turbulent medium;

j) a tracker and aim point controller which receives an image of the target from an illumination source, thereby generating a control signal to control the steering mirror;

k) a fifth WFS (no second, third or fourth WFS is named) receiving a HEL amplifier probe beam after it passes through the amplifier means; and l) said fifth WFS controlling a fifth correction and steering device pair (no second, third or fourth correction and steering device pair is named).

79. The system of claim 78, wherein the beam sampling optic is highly transmissive at the beacon wavelength and receive polarization, and is highly reflective at the beacon wavelength and transmit polarization, and is highly reflective at the HEL wavelength at both polarizations.

80. The system of claim 78, wherein the return beacon beam is formed as a cooperative beacon located at the target and pointed toward the transmitting HEL optical path.

81. The system of claim 78, wherein the return beacon beam is formed as an illuminator beam launched from an auxiliary telescope to illuminate the target, and the reflection from the target serves as the beacon beam.

82. The system of claim 78, wherein the return beacon beam is a solar illumination of the target.

83. The system of claim 78, wherein the return beacon beam is a thermal emission of the target.

84. The system of claim 78, wherein the amplifier means is an injection locked laser resonator.

85. The system of claim 78, wherein the image of the target is formed as a cooperative beacon located at the target and pointed toward the transmitting HEL optical path.

86. The system of claim 78, wherein the image of the target received by the aim point controller is either a passive or active illumination of the target.

87. The system of claim 78, wherein a sixth WFS receives a beacon amplifier probe beam after it passes through a beacon medium power amplifier and also receives a sample beam from the beacon amplifier probe beam.

88. The system of claim 87, wherein the sixth WFS controls a sixth correction and steering device pair.

89. The system of claim 78, wherein the amplifier means is a high power laser amplifier.

90. The system of claim 78, wherein the amplifier means is an injection locked laser amplifier.

91. The electro-optical system of claim 78, wherein a first part of the composite beam is directed to an about half waveplate that rotates the polarization of the composite beam by about 45 degrees and then to a polarizing beam splitter that directs the resultant interference patterns to a first and second camera with the resulting measurements being used to compute an estimate of the real part of a measured field of the return beacon beam.

92. The electro-optical system of claim 78, wherein a second part of the composite beam is directed first to an about quarter waveplate with its crystal axis approximately aligned to the polarization axis of the minority reference beam and then to an about half waveplate that rotates the polarization of the composite beam by about 45 degrees and then to a polarizing beam splitter that directs the resultant interference patterns to a third and fourth camera with the resulting measurements being used to compute an estimate of an imaginary part of a measured complex field of the return beacon beam.

93. The electro-optical system of claim 78, wherein the minority reference beam and the return beacon beam are at about orthogonal polarizations to one another.

94. The electro-optical system of claim 78, wherein the first WFS consists of an about $\pi/3$ waveplate, an about $5/3\pi$ waveplate, and an about $\pi$ waveplate each associated with a separate camera and can be aligned approximately to the minority reference beam polarization state.

95. (Variation of FIGS. 6, 9A, 9B, and 12) An electro-optical system for projection of laser beams through a turbulent medium to a non-cooperative target, the system comprising:

a) a mode locked beacon master oscillator that produces a majority beacon beam comprising a high repetition rate (ranging from about 100 to 100000 Hz) sequence of transform limited pulsed laser beams and producing a minority reference beam that has a repetition rate defined by the cavity length of the mode locked beacon master oscillator (ranging typically from MHz to GHz);

b) said majority beacon beam having an optical path to an amplifier means;

c) said amplifier means forming a high energy laser (HEL) beam to a target via an optical path;

d) said optical path including a steering mirror and a telescope;

e) wherein a timing delay circuit receives the minority reference beam and produces a delayed reference beam that is delayed to coincide with the arrival of a return beacon beam from a target aimpoint along a propagation path axis;

f) said majority high repetition rate beacon beam transmitted via an optical path to a medium power amplifier which sends the beacon beam via an optical path to the target;

g) wherein a return beacon beam comprising a high repetition rate pulse train beam returns from the target through the turbulent medium, telescope, optical path, and a quarter waveplate in the optical path, then passes through a first polarizing wave splitter optic;

h) wherein the high repetition rate return beacon beam is then directed to a first beacon wave front sensor (WFS) where it is combined with the minority reference beam to form a composite beam for phase measurement;

i) said first WFS controlling a first phase correction and steering device pair which (1) corrects the beacon beam with respect to phase aberrations caused by propagation through the turbulent medium and (2) provides phase commands to the first phase correction and steering device pair that will result in correction of amplitude aberrations in the beacon beam caused by propagation through the turbulent medium;

j) a tracker and aim point controller which receives an image of the target from an illumination source, thereby generating a control signal to control the steering mirror;

k) said minority reference beam further comprising a sample which goes to a second beacon WFS which also receives a sample of the return beacon beam after said return beacon beam passes through a further propagation optics and a third and second correction and steering device pair;

l) said second beacon WFS controlling a third correction and steering device pair which corrects for remaining aberrations in the return beacon beam, resulting in correction of both amplitude and phase aberrations caused by propagation through the turbulent medium;

m) a third WFS receives a sample beam from the minority mode locked beacon master oscillator beam after it passes through a spatial filter optic and the fourth correction and steering device pair to compare to a sample of the majority mode locked beacon master oscillator beam after it passes through an optical path including a propagation optics and the third correction and steering device pair;

n) said third WFS controlling a fourth correction and steering device pair to correct for aberrations induced by propagation through the third phase correction and steering device pair and propagation optics;

o) a fourth WFS receiving a sample of the majority mode locked beacon master oscillator beam and a minority mode locked beacon master oscillator beam after it passes through a spatial filter optic and the second correction and steering device pair;

p) said fourth WFS controlling a second phase correction and steering device pair to correct for aberrations in the master oscillator;

q) a fifth WFS receiving an amplifier probe beam after it passes through the amplifier means; and r) said fifth WFS controlling a fifth correction and steering device pair.

96. The system of claim 95, wherein the first and fourth pair of phase correction and steering device pairs are about optically conjugate to one another.

97. The system of claim 95, wherein the second and third pair of phase correction and steering device pairs are about optically conjugate to one another.

98. The system of claim 95, wherein the second and third pair of phase correction and steering device pairs have a free space propagation distance (from the conjugate plane of the first and fourth phase correction and steering device pairs) of approximately:

$$-D^2/\lambda N$$

where D is the beam size, $\lambda$ is the wavelength and N is the number of phase correction device actuator spacings across the beam.

99. The system of claim 95, wherein the image of the target is formed as a cooperative beacon located at the target and pointed toward the transmitting HEL optical path.

100. The system of claim 95, wherein the image of the target received by the aim point controller is either a passive or active illumination of the target.

101. The system of claim 95, wherein the amplifier means is a high power laser amplifier.

102. The system of claim 95, wherein the amplifier means is an injection locked laser amplifier.

103. The electro-optical system of claim 95, wherein a first part of the composite beam is directed to an about half waveplate that rotates the polarization of the composite beam by about 45 degrees and then to a polarizing beam splitter that directs the resultant interference patterns to a first and second camera with the resulting measurements being used to compute an estimate of a real part of a measured complex field of the return beacon beam.

104. The electro-optical system of claim 95, wherein a second part of the composite beam is directed first to an about quarter waveplate with its crystal axis approximately aligned to the polarization axis of the minority reference beam and then to an about half waveplate that rotates the polarization of the composite beam by about 45 degrees and then to a polarizing beam splitter that directs the resultant interference patterns to a third and fourth camera with the resulting measurements being used to compute an estimate of an imaginary part of a measured complex field of the return beacon beam.

105. The electro-optical system of claim 95, wherein the minority reference beam and the return beacon beam are at about orthogonal polarizations to one another.

106. The electro-optical system of claim 95, wherein the first and second WFS consists of an about $\pi/3$ waveplate, an about $5/3\pi$ waveplate, and an about $\pi$ waveplate each associated with a separate camera and can be aligned approximately to the minority reference beam polarization state.

107. (Variation of FIGS. 1, 9, and 12, with an aspect of 8—the approach for wavefront measurement with a non-cooperative target) An electro-optical system for projection of laser beams through a turbulent medium to a non-cooperative target, the system comprising:

a) a mode locked beacon master oscillator that produces a majority beacon beam comprising a high repetition rate (ranging from about 100 to 100000 Hz) sequence of transform limited pulsed laser beams (a beacon beam) and producing a minority reference beam that has a repetition rate defined by the cavity length of the mode locked beacon master oscillator (ranging typically from MHz to GHz);

b) said majority beacon beam having an optical path to an amplifier means;

c) said amplifier means forming a high energy laser (HEL) beam to a target via an optical path;

d) said optical path including a steering mirror and a telescope;

e) wherein a timing delay circuit receives the minority reference beam and produces a delayed reference beam that is delayed to coincide with an arrival of a return beacon beam from a target aimpoint along a propagation path axis;

f) said majority beacon beam transmitted via an optical path to a medium power amplifier which sends the majority beacon beam via an optical path to the target;

g) wherein a return beacon beam comprising a high repetition rate pulse train beam returns from the target through the turbulent medium, telescope, optical path, and a quarter waveplate in the optical path, then passes through a first polarizing wave splitter optic;

h) wherein the return beacon beam is then directed to a first beacon wave front sensor (WFS) where it is combined with the minority reference beam to form a composite beam for phase measurement;

i) said first WFS controlling a first phase correction and steering device pair which (1) corrects the beacon beam with respect to phase aberrations caused by propagation through the turbulent medium and (2) provides phase commands to the first phase correction and steering device pair that will result in correction of amplitude aberrations in the beacon beam caused by propagation through the turbulent medium;

j) a tracker and aim point controller which receives an image of the target from an illumination source to generate a control signal to control a steering mirror;

k) a third WFS receives a sample beam from the minority mode locked beacon master oscillator beam after it passes through a spatial filter optic and the fourth correction and steering device pair to compare to a sample of the majority mode locked beacon master oscillator beam after it passes through an optical path including a propagation optics and the third correction and steering device pair;

l) said third WFS also receives a HEL amplifier probe beam after it passes through the amplifier means to interfere with a sample probe beam from the HEL amplifier probe; and m) said third WFS controlling a fourth correction and steering device pair to correct for aberrations in the mode locked beacon master oscillator beam and high power amplifier.

108. The system of claim 107, wherein the first and fourth pair of phase correction and steering device pairs are about optically conjugate to one another.

109. The system of claim 107, wherein the image of the target is formed as a cooperative beacon located at the target and pointed toward the transmitting HEL optical path.

110. The system of claim 107, wherein the image of the target received by the aim point controller is either a passive or active illumination of the target.

111. The system of claim 107, wherein the amplifier means is a high power laser amplifier.

112. The system of claim 107, wherein the amplifier means is an injection locked laser amplifier.

113. The electro-optical system of claim 107, wherein a first part of the composite beam is directed to an about half waveplate that rotates the polarization of the composite beam by about 45 degrees and then to a polarizing beam splitter that directs the resultant interference patterns to a first and second camera with the resulting measurements being used to compute an estimate of a real part of a measured complex field of the return beacon beam.

114. The electro-optical system of claim 107, wherein a second part of the composite beam is directed first to an about quarter waveplate with its crystal axis approximately aligned to the polarization axis of the minority reference beam and then to an about half waveplate that rotates the polarization of the composite beam by about 45 degrees and then to a polarizing beam splitter that directs the resultant interference patterns to a third and fourth camera with the resulting measurements being used to compute an estimate of an imaginary part of a measured complex field of the return beacon beam.

115. The electro-optical system of claim 107, wherein the minority reference beam and the return beacon beam are at about orthogonal polarizations to one another.

116. The electro-optical system of claim 107, wherein the first WFS consists of an about π/3 waveplate, an about 5/3π waveplate, and an about π waveplate each associated with a separate camera and can be aligned approximately to the minority reference beam polarization state.

117. (Variation of FIG. 8) An electro-optical system for projection of laser beams through a turbulent medium to a non-cooperative target, the system comprising:

a) a mode locked beacon master oscillator that produces a majority high repetition rate (ranging from about 100 to 100000 Hz) sequence of transform limited pulsed laser beams (a beacon beam) and a minority reference beam that has a repetition rate defined by the cavity length of the mode locked beacon master oscillator (ranging typically from MHz to GHz);

b) said mode locked beacon master oscillator beam having an optical path to an amplifier means;

c) said amplifier means forming a high energy laser (HEL) beam to a target via an optical path;

d) said optical path including a steering mirror and a telescope;

e) wherein a timing delay circuit receives the minority reference beam and produces a delayed reference beam that is delayed to coincide with the arrival of a return beacon beam from a target aimpoint along a propagation path axis;

f) said majority high repetition rate beacon beam transmitted via an optical path to a medium power amplifier which sends the beacon beam via an optical path to the target;

g) wherein the high repetition rate return beacon pulse train beam returns from the target through the turbulent medium, telescope, optical path, and a quarter waveplate in the optical path, then passes through a first polarizing wave splitter optic;

h) wherein the return beacon beam is then directed to a first beacon wave front sensor (WFS) where it is combined with the minority reference beam to form a composite beam for phase measurement;

i) said first WFS controlling a first phase correction and steering device pair which corrects the beacon beam with respect to phase aberrations caused by propagation through the turbulent medium;

j) a tracker and aim point controller which receives an image of the target from an illumination source, thereby generating a control signal to control the steering mirror;

k) a third WFS (no second WFS is named) receives a sample beam from the minority mode locked beacon master oscillator beam after it passes through a spatial filter optic and the fourth correction and steering device pair to compare to a sample of the majority mode locked beacon master oscillator beam after it passes through an optical path including a propagation optics and the third correction and steering device pair;

l) said third WFS controlling a fourth correction and steering device pair to correct for aberrations induced by propagation through the third phase correction and steering device pair and propagation optics;

m) a fifth WFS (no fourth WFS is named) receiving a HEL amplifier probe beam after it passes through the amplifier means; and n) said fifth WFS controlling a fifth correction and steering device pair.

118. The system of claim 117, wherein the first and fourth pair of phase correction and steering device pairs are about optically conjugate to one another.

119. The system of claim 117, wherein the beam sampling optic is highly transmissive at the beacon wavelength and receive polarization, and is highly reflective at the beacon wavelength and transmit polarization, and is highly reflective at the HEL wavelength at both polarizations.

120. The system of claim 117, wherein the image of the target is formed as a cooperative beacon located at the target and pointed toward the transmitting HEL optical path.

121. The system of claim 117, wherein the image of the target received by the aim point controller is either a passive or active illumination of the target.

122. The system of claim 117, wherein the amplifier means is a high power laser amplifier.

123. The system of claim 117, wherein the amplifier means is an injection locked laser amplifier.

124. The electro-optical system of claim 117, wherein a first part of the composite beam is directed to an about half waveplate that rotates the polarization of the composite beam by about 45 degrees and then to a polarizing beam splitter that directs the resultant interference patterns to a first and second camera with the resulting measurements being used to compute an estimate of a real part of a measured complex field of the return beacon beam.

125. The electro-optical system of claim 117, wherein a second part of the composite beam is directed first to an about quarter waveplate with its crystal axis approximately aligned to the polarization axis of the minority reference beam and then to an about half waveplate that rotates the polarization of the composite beam by about 45 degrees and then to a polarizing beam splitter that directs the resultant interference patterns to a third and fourth camera with the resulting measurements being used to compute an estimate of an imaginary part of a measured complex field of the return beacon beam.

126. The electro-optical system of claim 117, wherein the minority reference beam and the return beacon beam are at about orthogonal polarizations to one another.

127. The electro-optical system of claim 117, wherein the first WFS consists of an about $\pi/3$ waveplate, an about $5/3\pi$ waveplate, and an about $\pi$ waveplate each associated with a separate camera and can be aligned approximately to the minority reference beam polarization state.

128. (Variation of FIG. 7) An electro-optical system for projection of laser beams through a turbulent medium to a non-cooperative target, the system comprising:
   a) a mode locked beacon master oscillator that produces a majority beacon beam comprising a high repetition rate (ranging from about 100 to 100000 Hz) sequence of transform limited pulsed laser beams (a beacon beam) and producing a minority reference beam that has a repetition rate defined by the cavity length of the mode locked beacon master oscillator (ranging typically from MHz to GHz);
   b) said mode locked beacon master oscillator beam having an optical path to an amplifier means;
   c) said amplifier means forming a high energy laser (HEL) beam to a target via an optical path;
   d) said optical path including a steering mirror and a telescope;
   e) wherein a timing delay circuit receives the minority reference beam and produces a delayed reference beam that is delayed to coincide with the arrival of a return beacon beam from a target aimpoint along a propagation path axis;
   f) said majority beacon beam transmitted via an optical path to a medium power amplifier which sends the majority beacon beam via an optical path to the target;
   g) wherein a return beacon beam comprising a high repetition rate pulse train beam returns from the target through the turbulent medium, telescope, optical path, and a quarter waveplate in the optical path, then passes through a first polarizing wave splitter optic;
   h) wherein the return beacon beam is then directed to a first beacon wave front sensor (WFS) where it is combined with the minority reference beam to form a composite beam for phase measurement;
   i) said first WFS controlling a first phase correction and steering device pair which (1) corrects the beacon beam with respect to phase aberrations caused by propagation through the turbulent medium and (2) provides phase commands to the first phase correction and steering device pair that will result in correction of amplitude aberrations in the beacon beam caused by propagation through the turbulent medium;
   j) a tracker and aim point controller which receives an image of the target from an illumination source, thereby generating a control signal to control the steering mirror;
   k) a third WFS (no second WFS is named) receives a sample beam from the minority reference beam after it passes through a spatial filter optic and the fourth correction and steering device pair to compare to a sample of the majority beacon beam after it passes through an optical path including a propagation optics and the third correction and steering device pair (no second correction and steering device par is named);
   l) said third WFS controlling a fourth correction and steering device pair to correct for aberrations induced by propagation through the third phase correction and steering device pair and propagation optics;
   m) a fifth WFS receiving a HEL amplifier probe beam after it passes through the amplifier means; and
   n) said fifth WFS controlling a fifth correction and steering device pair.

129. The system of claim 128, wherein the first and fourth pair of phase correction and steering device pairs are about optically conjugate to one another.

130. The system of claim 128, wherein the third pair of phase correction and steering device pairs have a free space propagation distance (from the conjugate plane of the first and fourth phase correction and steering device pairs) of approximately:

$$-D^2/\lambda N$$

where D is the beam size, $\lambda$ is the wavelength and N is the number of phase correction device actuator spacings across the beam.

131. The system of claim 128, wherein the image of the target is formed as a cooperative beacon located at the target and pointed toward the transmitting HEL optical path.

132. The system of claim 128, wherein the image of the target received by the aim point controller is either a passive or active illumination of the target.

133. The system of claim 128, wherein the amplifier means is a high power laser amplifier.

134. The system of claim 130, wherein the amplifier means is an injection locked laser amplifier.

135. The electro-optical system of claim 128, wherein a first part of the composite beam is directed to an about half waveplate that rotates the polarization of the composite beam by about 45 degrees and then to a polarizing beam splitter that directs the resultant interference patterns to a first and second camera with the resulting measurements being used to compute an estimate of a real part of a measured complex field of the return beacon beam.

136. The electro-optical system of claim 128, wherein a second part of the composite beam is directed first to an about quarter waveplate with its crystal axis approximately aligned to the polarization axis of the minority reference beam and then to an about half waveplate that rotates the polarization of the composite beam by about 45 degrees and then to a polarizing beam splitter that directs the resultant interference patterns to a third and fourth camera with the resulting measurements being used to compute an estimate of an imaginary part of a measured complex field of the return beacon beam.

137. The electro-optical system of claim 1280, wherein the minority reference beam and the return beacon beam are at about orthogonal polarizations to one another.

138. The electro-optical system of claim 128, wherein the first and second WFS consists of an about $\pi/3$ waveplate, an about $5/3\pi$ waveplate, and an about $\pi$ waveplate each associated with a separate camera and can be aligned approximately to the minority reference beam polarization state.

139. (Variation of FIG. 8) An electro-optical system for projection of laser beams through a turbulent medium to a non-cooperative target, the system comprising:
  a) a mode locked beacon master oscillator that produces a majority beacon beam comprising a high repetition rate (ranging from about 100 to 100000 Hz) sequence of transform limited pulsed laser beams and producing a minority reference beam that has a repetition rate defined by the cavity length of the mode locked beacon master oscillator (ranging typically from MHz to GHz);
  b) said mode locked beacon master oscillator beam having an optical path to an amplifier means;
  c) said amplifier means forming a high energy laser (HEL) beam to a target via an optical path;
  d) said optical path including a steering mirror and a telescope;
  e) wherein a timing delay circuit receives the minority reference beam and produces a delayed reference beam that is delayed to coincide with the arrival of a return beacon beam from a target aimpoint along a propagation path axis;
  f) said majority beacon beam transmitted via an optical path to a medium power amplifier which sends the majority beacon beam via an optical path to the target;
  g) wherein a return beacon a beam comprising a high repetition rate pulse train beam returns from the target through the turbulent medium, telescope, optical path, and a quarter waveplate in the optical path, then passes through a first polarizing wave splitter optic;
  h) wherein the return beacon beam is then directed to a first beacon wave front sensor (WFS) where it is combined with the minority reference beam to form a composite beam for phase measurement;
  i) said first WFS controlling a first phase correction and steering device pair which corrects the majority beacon beam with respect to phase aberrations caused by propagation through the turbulent medium;
  j) a tracker and aim point controller which receives an image of the target from an illumination source, thereby generating a control signal to control the steering mirror;
  k) a fifth WFS (no second, third or fourth WFS is named) receiving a HEL amplifier probe beam after it passes through the amplifier means; and
  l) said fifth WFS controlling a fifth correction and steering device pair (no second, third or fourth correction and steering device pair is named).

140. The system of claim 139, wherein the beam sampling optic is highly transmissive at the beacon wavelength and receive polarization, and is highly reflective at the beacon wavelength and transmit polarization, and is highly reflective at the HEL wavelength at both polarizations.

141. The system of claim 139, wherein the image of the target is formed as a cooperative beacon located at the target and pointed toward the transmitting HEL optical path.

142. The system of claim 139, wherein the image of the target received by the aim point controller is either a passive or active illumination of the target.

143. The system of claim 139, wherein the amplifier means is a high power laser amplifier.

144. The system of claim 139, wherein the amplifier means is an injection locked laser amplifier.

145. The electro-optical system of claim 139, wherein a first part of the composite beam is directed to an about half waveplate that rotates the polarization of the composite beam by about 45 degrees and then to a polarizing beam splitter that directs the resultant interference patterns to a first and second camera with the resulting measurements being used to compute an estimate of a real part of a measured complex field of the return beacon beam.

146. The electro-optical system of claim 139, wherein a second part of the composite beam is directed first to an about quarter waveplate with its crystal axis approximately aligned to the polarization axis of the minority reference beam and then to an about half waveplate that rotates the polarization of the composite beam by about 45 degrees and then to a polarizing beam splitter that directs the resultant interference patterns to a third and fourth camera with the resulting measurements being used to compute an estimate of an imaginary part of a measured complex field of the return beacon beam.

147. The electro-optical system of claim 139, wherein the minority reference beam and the return beacon beam are at about orthogonal polarizations to one another.

148. The electro-optical system of claim 139, wherein the first WFS consists of an about $\pi/3$ waveplate, an about $5/3\pi$ waveplate, and an about $\pi$ waveplate each associated with a separate camera and can be aligned approximately to the minority reference beam polarization state.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
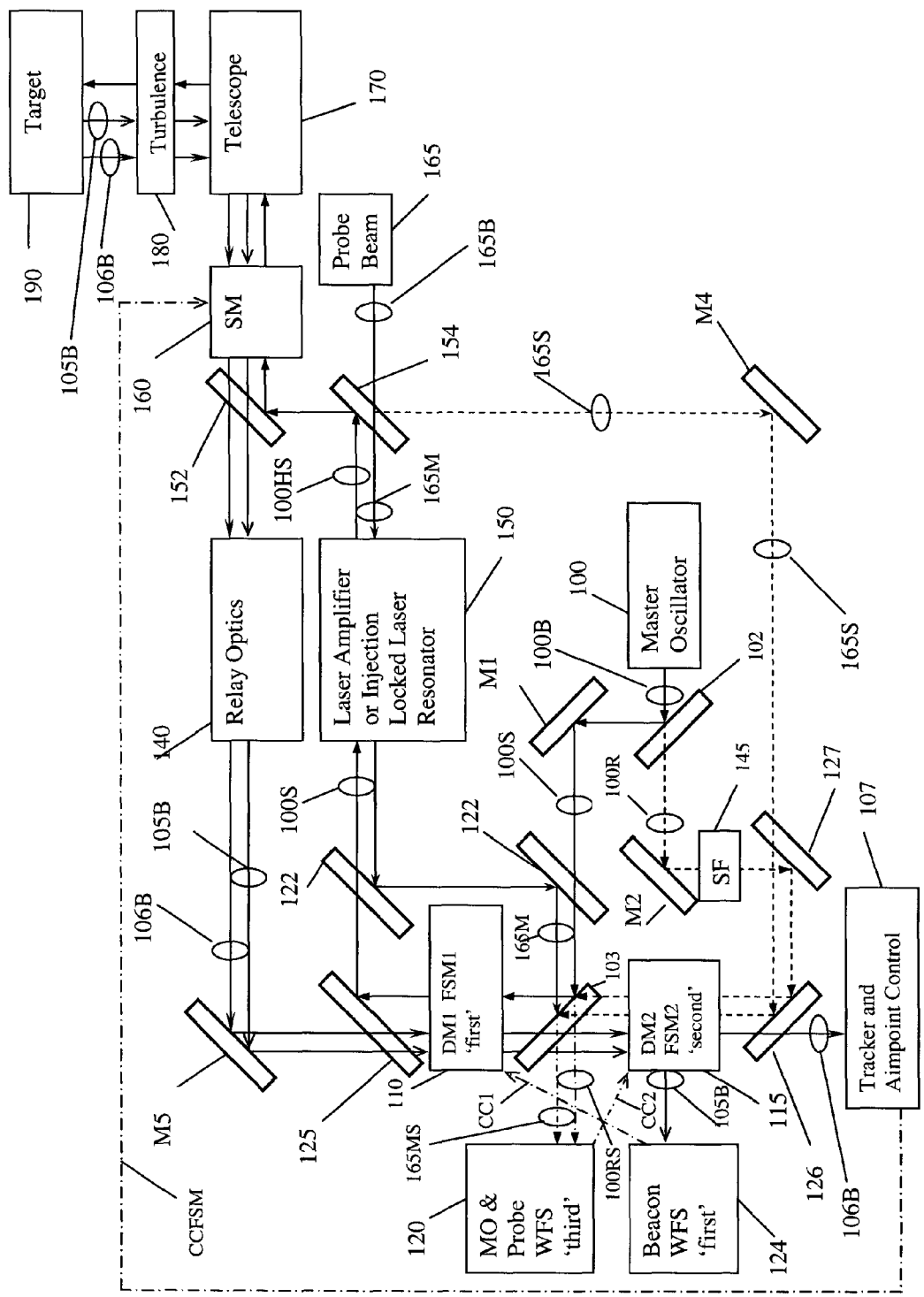
FIG. 1 is a schematic illustrating the principle of pre-compensation of phase aberrations both in a laser amplifier and due to turbulence; including correction of aberrations in the master oscillator beam.

FIG. 1 is a block diagram schematic illustrating the principle of pre-compensation of phase aberrations both in a laser amplifier and due to turbulence; including correction of aberrations in the master oscillator beam. FIG. 1 is shown by way of example and not of limitation. There are alternate means of displaying the laser path(s) as those skilled in the art would recognize. The most straightforward form of the Integrated Laser Field Conjugation System (ILFCS) is illustrated in FIG. 1. The system consists of a low power master oscillator 100 with master oscillator beam 100B where low power is defined as "low enough to be compensated using the phase correction device selected". The master oscillator beam or high energy laser beam 100B is directed to beam splitter 102 that is highly reflective at the wavelength of the master oscillator. Beam splitter 102 divides the master oscillator beam 100B into high energy laser (HEL) seed beam 100S, and HEL reference beam 100R. The majority of the master oscillator beam, HEL seed beam 100S is directed via mirror M1 through the probe aperture sharing element 122 (which those skilled in the art will recognize should normally be a reflective aperture sharing element despite being shown here as transmissive at the HEL seed beam wavelength) and through the phase correction device and fine steering mirror 'pair 1' 110 (generically the phase correction device is labeled as a DM or deformable mirror here while the fine steering mirror is generically labeled as a FSM but neither are restricted to being reflective phase correction/steering devices). HEL reference beam 100R is spatially filtered via the spatial filter optics 145. The spatial filter optics can be one of any number of methods known to those skilled in the art, including use of a single mode fiber or pinhole filter. The HEL reference beam 100R is then directed through the phase correction device and fine steering mirror 'pair 2' 115 and to the highly reflective beam splitter 103 (at the master oscillator wavelength). The 'second' phase correction device and fine steering mirror pair 115 can be optically conjugate to the 'first' phase correction device and fine steering mirror pair 110 where optically conjugate is defined such that the optical planes are in equivalent locations along the propagation path. An interference pattern 100RS of the two master oscillator beam samples is formed that is relayed to the master oscillator (MO) wavefront sensor (WFS) 120. The majority sample of the master oscillator beam HEL reference beam 100S, after passing through the phase correction device and FSM 'pair 1' 110 system is directed by the Beacon Aperture Sharing Element 2 (ASE2) 125 through a high power laser amplifier 150 (or is used to injection seed a high power laser resonator). The Beacon ASE2 125 is designed to be highly transmissive for the return beacon beam 105B and highly reflective for the HEL seed beam 100S. Selection and design of the Beacon ASE is well understood for those skilled in the art.

The nominal form for the laser resonator could be either a single or multi-pass amplifier or it could be an unstable laser resonator. In the latter case this laser resonator would nominally be configured as either an amplifier (where multi-pass gain is effected from design of the unstable resonator geometry) or as a classical injection locked ring laser resonator. The laser amplifier 150 (or resonator), regardless, must have sufficient field of view to enable pre-compensation for the aberrations in turbulence that will be carried on the beam through the laser amplifier or resonator. The resultant high power beam 100HS after amplification reflects off of the Probe ASE 154 and an additional Beacon ASE1 152 (where the Beacon ASE2 125 is identical or very similar in nature to the Beacon ASE1 152). The Probe ASE 154 is designed to be highly reflective at the HEL wavelength and sufficiently transmissive at the Probe Beam 165 wavelength. Next, the high power beam 100HS is directed through a common path steering device (SM) 160 (nominally labeled SM for steering mirror but this could include both a coarse and fine steering mirror and is not restricted to being a reflective mirror device) and then to the telescope 170 (or beam director) which focuses the beam through turbulence (turbulent medium) 180 to target 190. A return beacon beam 105B is used to measure the aberrations in the turbulent medium 180 and telescope 170 and overall optical beam path. Return beacon beam 105B may be reflected from a non-cooperative target or it can be from a generated source beacon 105 at the target. By means of an unspecified method, a return beacon beam 105B from the target 190 propagates through turbulence 180 and the telescope or beam director 170 and common path SM 160. The return beacon beam 105B then passes through beacon ASE1 152 and then is relayed using standard methods through relay optics 140 and mirror M5 and through beacon ASE2 125. Return beacon beam 105B then is directed through first the phase correction device and DM1/FSM1 pair 110 and then through the phase correction device and DM2/FSM2 pair 115 and into the Beacon WFS 124. The majority sample of the probe beam 165M of a probe beam 165 is injected at Probe 'ASE 1' 154 and passes through the laser amplifier 150. This probe beam is used to measure the aberrations in the laser gain medium. This sample of the probe beam is directed around the phase correction device and DM1/FSM1 pair 110 using Probe 'ASE 2' 122 and Probe 'ASE 3' 123 and through the beam splitter 103 between the phase correction device and FSM pairs.

The minority sample probe reference beam 165S of probe beam 165 that reflects from Probe 'ASE 1' 154 is directed for injection co-linear to the master oscillator reference beam to form the probe reference beam 165S at the probe injection element 127. Probe reference beam 165S is then directed through the phase correction device and DM2/FSM2 pair 115 and then reflects off of beam splitter 103 between the phase correction device and FSM pairs and the resultant interference pattern is directed to the MO and Probe WFS 120.

Finally, along the beacon beam path, an imaging beam path at an additional suitable wavelength to generate imagery of the target 190 is included. The imaging beam 106B is generated using either passive or active illumination of the target. If a point source beacon is available, then the imaging beam can be a sample of the beacon beam. The imaging beam path is noted to include correction by all correction devices in the beam path. The imaging beam path is directed into an imaging camera or cameras (within the tracker and aimpoint control 107) that can be used by standard methods for control of tracking and the aimpoint 107. Tracker and aimpoint control 107 adjusts steering mirror 160 via controls CCFSM for target tracking.

The discussion above focused only on description of the optical beam paths, but did not describe how the phase correction devices and steering devices are controlled. The details of the control systems are not critical for implementation of the ILFCS and are described briefly below.

The imaging beam path signal 106B is used to control the common path steering device (SM 160). Any number of standard tracking and pointing algorithms for object tracking and pointing can be used, including but not limited to offset centroid tracking, offset thresholded centroid tracking, offset leading edge tracking, etc.

Next, the beacon wavefront sensor signal is used to control phase correction device (DM1 110) via control signal CC1. A very low bandwidth, leaky integrator control loop from this sensor to control the steering device (FSM1 110) may be used if necessary to compensate for slow rate non-common path drift. It should be noted that the correction applied to phase correction device 110 inherently includes commands that will attempt to correct not only for the measured aberrations in the turbulent beam path 180, but also aberrations present on the phase correction device DM2 115. This is illustrated by the following:

1. Measurements on beacon path WFS are $e_B = \phi_A + c_1 + c_2$, where $\phi_A$ is the aberration induced by propagation through turbulence 180 and the telescope 170, $c_1$ is the correction applied by the phase correction device 110, and $c_2$ is the correction applied by the phase correction device 115.
2. As a result, the command that nulls the error, $e_B$, is $c_1 = -\phi_A - c_2$.

The probe and HEL interference fringe patterns are used to control phase correction device (DM2) and steering device (FSM 2) pair 115 via control signals CC2. Because the phase correction and steering device pair 115 are only applied to the probe and HEL reference devices, the appropriate control commands generated for compensation are not the opposite of the measured aberrations in the HEL master oscillator 100 and probe beams, but instead match the aberrations in the HEL master oscillator beam 100B and probe beam 165. This is illustrated by the following:

1. Measurements on the MO and probe WFS 120 are respectively $e_H = \phi_H - c_2$, and $e_p = \phi_L - c_2$, where $\phi_H$ is the aberration on the HEL master oscillator beam and $\phi_L$ is aberration in the laser amplifier beam path.
2. The command that nulls the signal $e_H + e_p$ is $c_2 = \phi_H + \phi_L$.

In so doing, we note at this point that a copy of the aberrations in the laser resonator is introduced into the signal observed by the beacon beam path WFS.

Due to the fact already noted that the beacon path WFS 124 then observes the aberrations on the phase correction device 115, we note that the resultant command applied to phase correction device 1 110 is given by;

$$c_1 = -\phi_A - \phi_H - \phi_L$$

(the Command that Nulls the Error, $e_B$)

This exact command provides compensation for both aberrations in the injected high energy laser master oscillator 100, the laser gain medium, and for propagation through turbulence 180—precisely the desired result. This command is applied to a correction device in the low power beam path.

The remaining control paths to be noted are control of the steering devices FSM1 110 and FSM2 115. We have already noted an optional low bandwidth leaky integral control path for the steering device FSM1 110 from the beacon path WFS. The low bandwidth correction applied to FSM2 115 is the tilt signal from the interference patterns observed on the MO and Probe WFS 120. In addition the opposite of this same signal is applied to FSM1 110. This ensures that pre-compensation for tilt in the laser amplifier 150 is included, but pre-compensation for turbulence induced aberrations is confined to correction by the steering mirror, SM 160 after the laser amplifier 150. This method will avoid loss of field of view and reduction in laser amplification efficiency due to attempting to correct for turbulence induced tilt aberrations prior to the amplifier.

At this point, we can note for the imaging path, due to the fact that the imaging sensor is corrected by all of the correction devices, the laser and master oscillator aberrations on the correction devices cancel one another, leaving a beam path that is corrected for turbulence (the imaging beam path incurs turbulence induced aberrations which are then corrected by the phase correction device 1 110).

Thus, the MO and Probe WFS 120 functions to receive the interference patterns of the master oscillator majority beam 100S and minority beam 100R and probe majority beam 165M and minority beam 165S using the measured wavefront error to control the device pair DM2/FSM2 115 to provide a copy of aberrations of the probe beam (including the laser amplifier 150 aberrations) and MO beam and place them onto DM2/FSM2 pair 115. In a similar manner Beacon WFS 124 places aberrations due to turbulence, telescope, relay optics and the beam path onto DM1/FSM1 pair 110. In addition, the Beacon WFS 124 inherently also measures the aberrations on the DM2/FSM2 pair 115, and thus also controls the DM1/FSM1 pair 110 to compensate for aberrations in the laser amplifier and master oscillator beam.

In consideration of the beacon beams shown above in FIG. 1 and below in FIGS. 2-5, the beacon beam can be formed from a large number of methods known to those skilled in the art. For example, the beacon beam could be a point source, or cooperative beacon, located at the target of interest and directed toward the transmitting system. Alternately, the beacon could be an illuminator beam launched from an auxiliary telescope to illuminate the target where the reflection from the target serves as the beacon beam. Alternately, the beacon could be solar illumination of the target or thermal emission of the target. If the Target is non-cooperative, the preferred configuration for the beacon beam that is the subject of this invention is utilized in FIGS. 6-9 below. It should be noted that mirrors in the optical path are numbered and explained when necessary, other mirrors are provided to show the optical path and may or may not be labeled.

In consideration of the imaging beam in this invention, the imaging beam can be formed from a large number of methods known to those skilled in the art. The imaging beam is only subject to the constraint that it must enable tracking of the object/target aimpoint for pointing the outgoing HEL beam. For example, if a cooperative point source is available for the beacon beam, then this beam is also suitable for use as the imaging beam for use in tracking. Alternately, the imaging beam could be the return from active illumination of the target from a laser source mounted on an auxiliary aperture, where said return is used to provide an image of the target for use in tracking and pointing. Alternately a passive image from solar illumination or thermal emission of the target could be used. The distinction between the imaging beam and the beacon beam is primarily that if the target is "non-cooperative" then the imaging beam must typically be large enough at the target to ensure that inertial "edges" of the target are imaged and can be used as reference points for tracking. In contrast, one typically would prefer the beacon beam to be as small as possible at the target to provide the highest quality wavefront sensing measurements.

There are two alternate configurations that share the same top level advantages as that described by FIG. 1. These are provided in FIG. 2 and FIG. 3.

Figure 2:
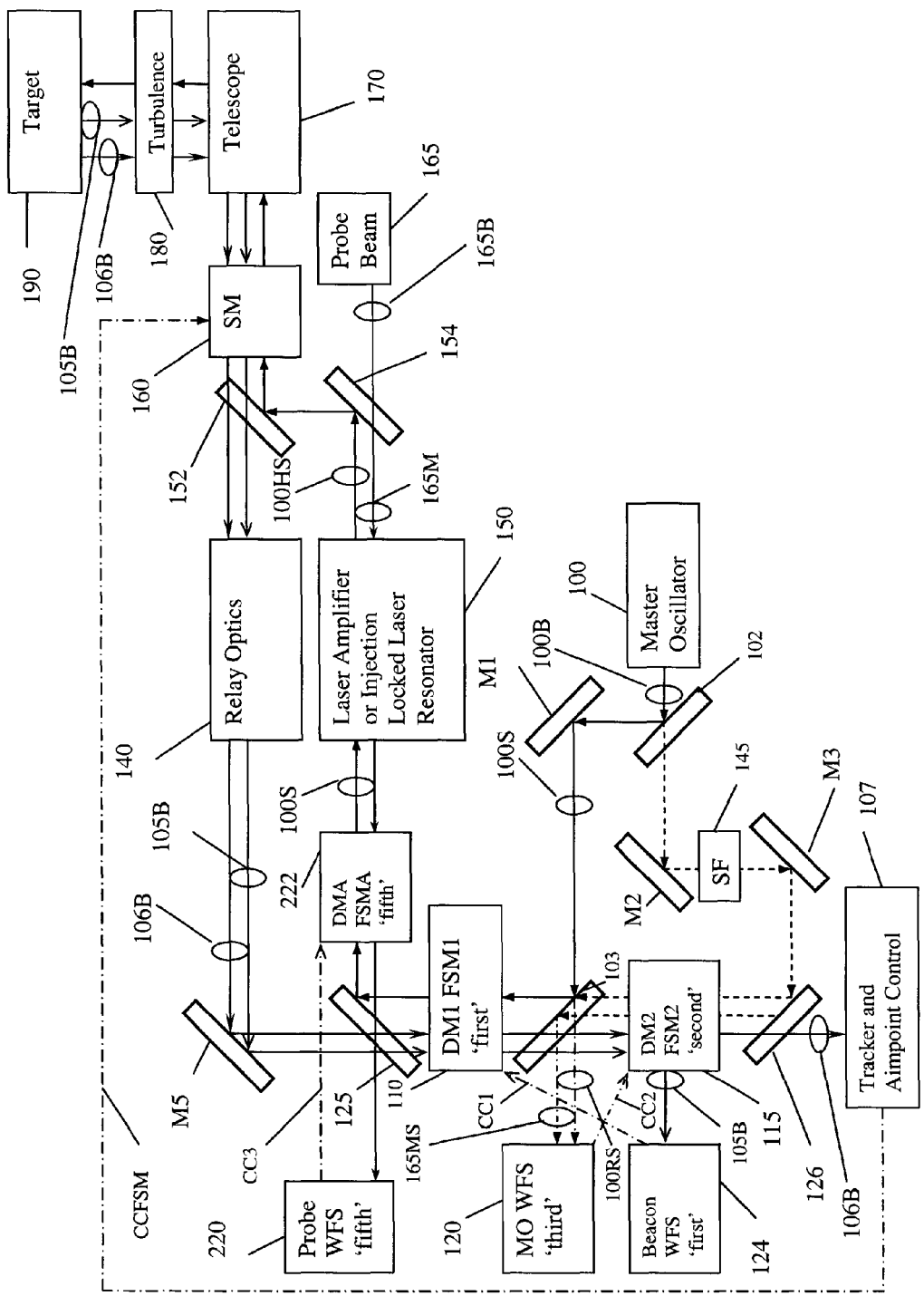
FIG. 2. is a second alternate embodiment schematic of the present invention illustrating the principle of pre-compensation of phase aberrations both in a laser amplifier and due to turbulence; including correction of aberrations in the master oscillator beam.

FIG. 2 is a second alternate schematic of the present invention illustrating the principle of pre-compensation of phase aberrations both in a laser amplifier 150 and due to turbulence 180; including correction of aberrations in the master oscillator beam 100B. The first alternate configuration shown in FIG. 2 has the disadvantage that it introduces a $3^{rd}$ steering and phase correction device pair (DM A, FSM A) 222. This same configuration, however, has the advantage of providing a more simplistic and straightforward to understand implementation. The compensation of aberrations in the master oscillator beam 100B is by the same method as that detailed for FIG. 1, while compensation of aberrations in the amplifier 150 is effected by standard adaptive optical system compensation of the probe beam path using DM A and FSM A pair 222 using the signal CC3 from the PRB WFS 220. By compensation of the probe beam path, the aberrations in the outgoing high energy laser beam path are pre-compensated. Due to the nature of amplifier aberrations, which tend to be thermal induced—i.e. large amplitude but low spatial frequency—the choice of the Probe Wavefront Sensor 220 is highly flexible. Standard Hartmann sensor technology would be adequate provided it can meet the necessary closed loop temporal and spatial bandwidth requirements. Any other wavefront sensing technique designed to meet the temporal and spatial bandwidth requirements would be acceptable.

Figure 3:
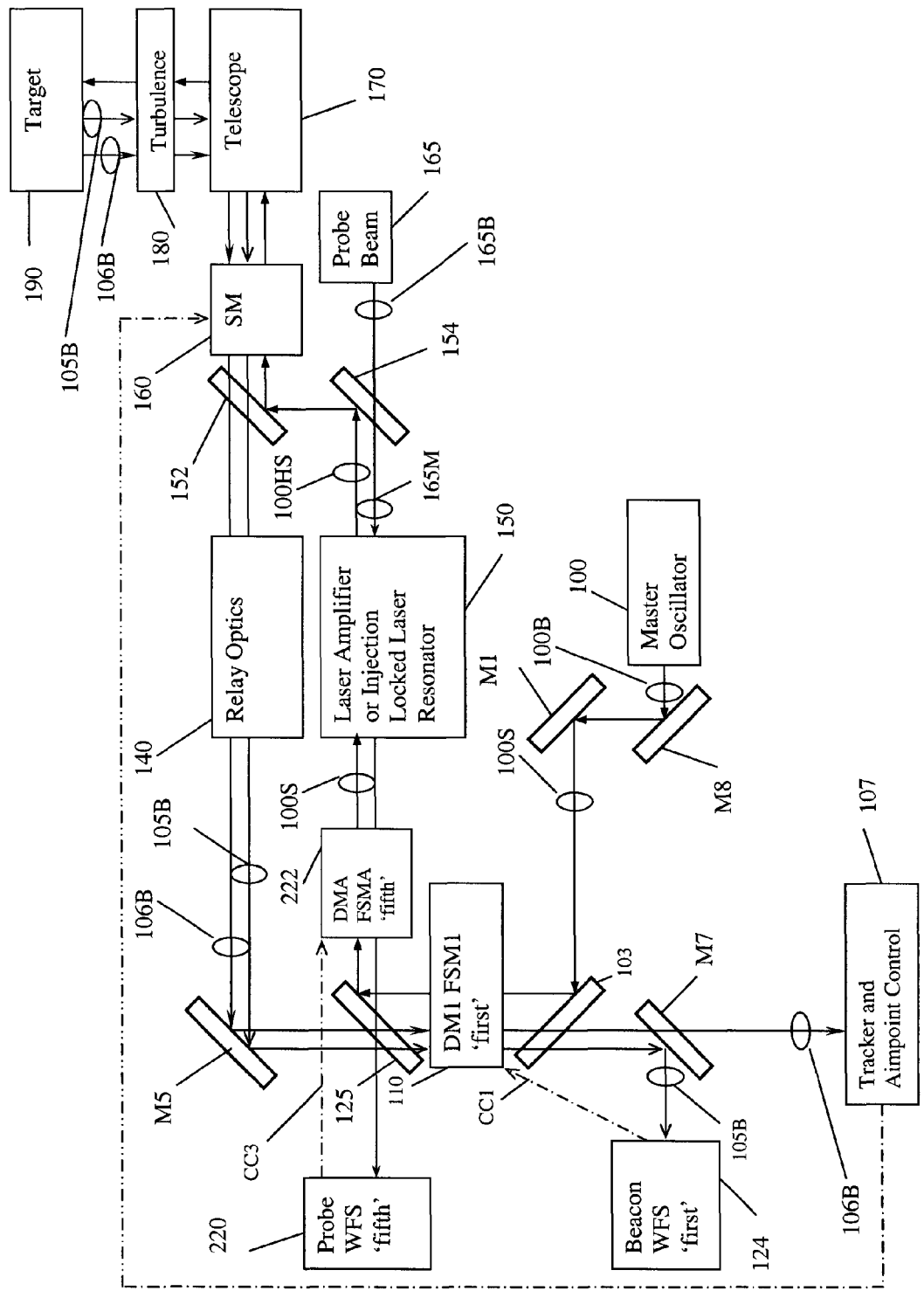
FIG. 3 is a third alternate schematic of the present invention illustrating the principle of pre-compensation of phase aberrations both in a laser amplifier and due to turbulence; excluding correction of aberrations in the master oscillator beam.

The configuration in FIG. 3 is a third alternate embodiment and is identical to that in FIG. 2, except for the fact that only two steering and phase correction device pairs 110, 222 are required because we assume that there are no aberrations in the master oscillator beam 100B.

Figure 4:
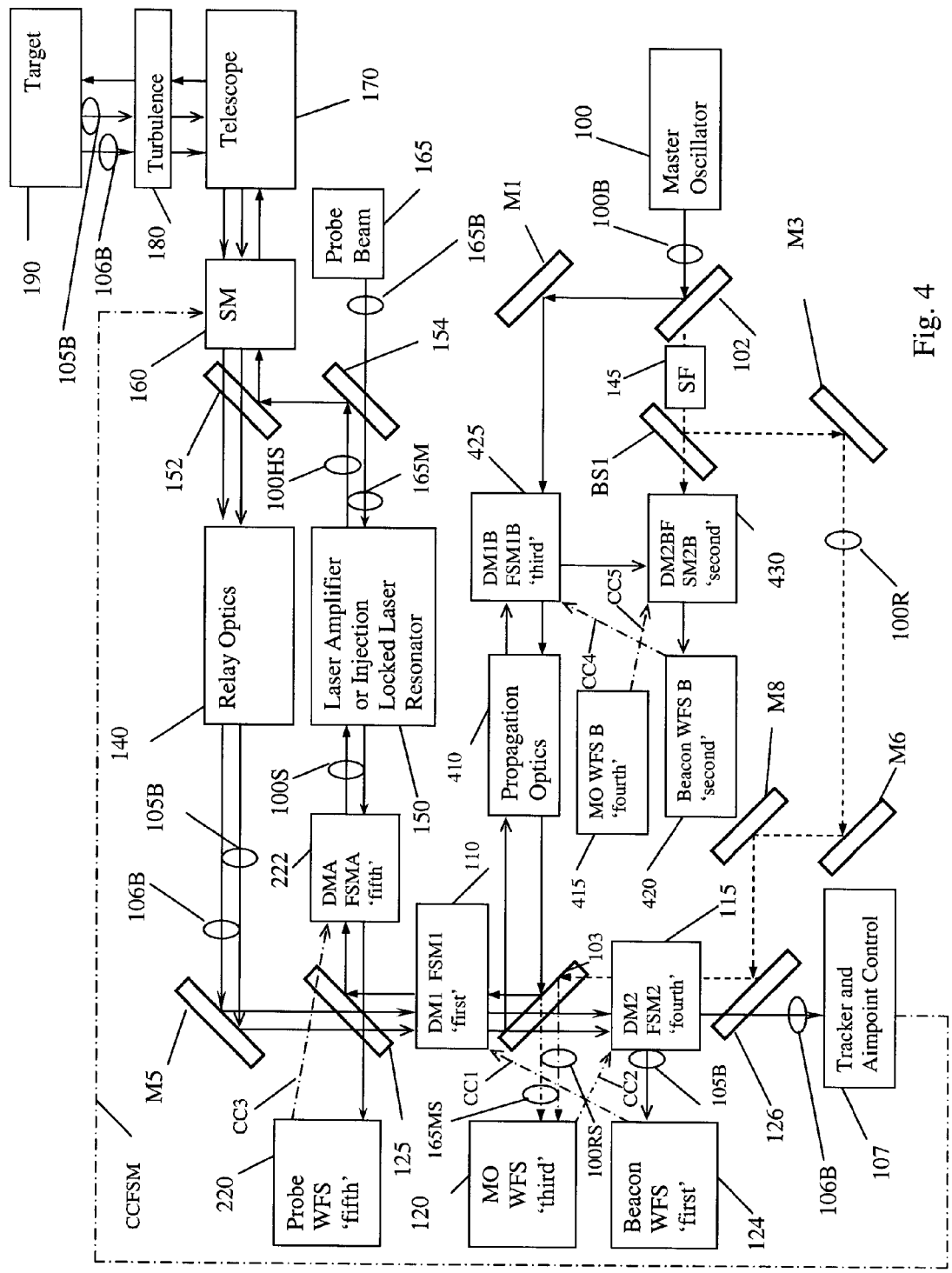
FIG. 4 is a fourth alternate embodiment schematic of the present invention illustrating the principle of pre-compensation of phase and amplitude aberrations both in a laser amplifier and due to turbulence; including correction of aberrations in the master oscillator beam.

FIG. 4 is a fourth alternate embodiment schematic of the present invention illustrating the principle of pre-compensation of phase and amplitude aberrations both in a laser amplifier 150 and due to turbulence 180; including correction of aberrations in the master oscillator beam 100B. The configuration described in FIGS. 1-3 provides only for compensation of phase aberrations due to propagation through turbulence. An alternate method that incorporates compensation of both amplitude and phase aberrations is illustrated in FIG. 4. This schematic utilizes features from both the configurations described in FIGS. 1, 2. A second pair of phase correction and steering devices DM 1B 425 and DM 2B 430 is added to effect amplitude compensation. The optical propagation paths are self-explanatory from FIG. 4 with the following three details requiring further explanation.

A. The first point to note is in regard to the "propagation optics" between the pairs of phase correction and steering devices. The pair DM 1A, FSM 1A 110 and DM 2A, FSM 2A 115 are about optically conjugate to one another. The pair DM 1B, FSM 1B 425 and DM 2B, FSM 2B 430 are about optically conjugate to one another. However, there is a free space propagation distance between the pair 1A/2A (210, 215) and 1B/2B (425, 430) that is effected by the "propagation optics" 410. There are a number of well known methods to implement the propagation distance using an optical configuration. The free space propagation distance is arbitrary, but past work suggests that the optimal distance for best correction of both amplitude and phase aberration is roughly 'negative $D^2/\lambda N$' where 'D' is the beam size, '$\lambda$' is the wavelength, and 'N' is the number of phase correction device actuator spacings across the beam (ref. 2; 3; 4).

B. The second point to note is in regard to the beam sampling optic 103 located between the DM1A/FSM1A 210 and DM2A/FSM2A 220 pairs. This beam sampling optic 103, as shown here would be an optic that splits the light roughly 50% at the beacon wavelength, while being highly reflective at the HEL wavelength. The specifications of such an optic are highly application dependent and not discussed further here. As depicted here, standard considerations would be adequate for specification of this optic.

C. The third and final point to note is in regard to the pre-compensation of laser aberrations. Although it is tempting to think that the interferometric technique described by FIG. 1 can be used herein as well for compensation of laser amplifier aberrations, use of this technique corrupts the ability to compensate for amplitude aberrations, thus the amplifier aberrations are compensated by the technique described in FIG. 2.

The principle of operation of the control system associated with DM/FSM pairs 1B/2B 425, 430 is very similar to that for DM/FSM pairs 1A/2A 210, 215:

1. Measurements on beacon path WFS 415 are $e_{B,B} = \phi_{A,B} + c_{1,B} + c_{2,B}$, where $\phi_{A,B}$ is the aberration induced by propagation through turbulence 180 and the telescope 170 measured at the plane of correction devices DM1B/FSM1B 425 and DM2B/FSM2B 430, $c_{1,B}$ is the correction applied by the phase correction device DM1B/FSM1B 425, and $c_{2,B}$, is the correction applied by the phase correction device DM2B/FSM2B 430.

2. As a result, the command CC4 that nulls the error, $e_{B,B}$, is $C_{1,B} = -\phi_{A,B} - c_{2,B}$.

3. Measurements on the HEL WFS B 420 are $e_{H,B} = \phi_{H,B} - c_{2,B}$, where $\phi_{H,B}$ is the aberration on the HEL master oscillator beam 100B.

4. The command CC3 that nulls the signal $e_{H,B}$ is $c_{2,B} = \phi_{H,B}$.

5. The command that nulls the error, $e_{B,B}$, is now seen to be $c_{1,B} = -\phi_{A,B} - \phi_{H,B}$.

In the case of the operation of the steering device FSM 1B 425, the tilt from the beacon WFS B 420 is utilized for high bandwidth control. In the case of the operation of the steering device FSM 2B 430, the tilt from the HEL WFS B 415 is used for high bandwidth control. The issues associated with moving atmospheric tilt correction to the steering device SM 160 are only applicable to the first phase correction and steering device pairs 1A/2A 425, 430.

Figure 5:
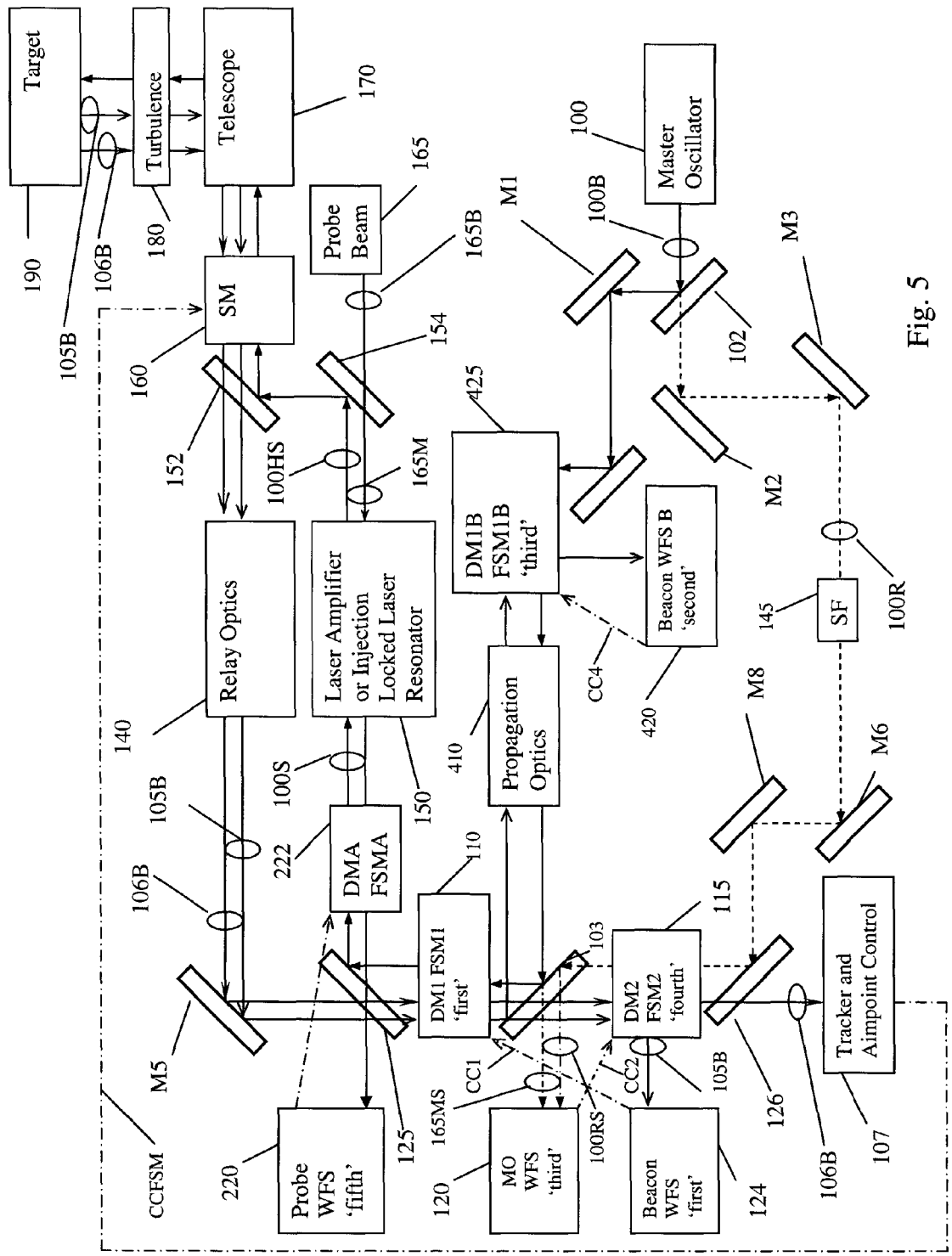
FIG. 5 is a schematic of the present invention illustrating the principle of pre-compensation of phase and amplitude aberrations both in a laser amplifier and due to turbulence; excluding correction of aberrations in the master oscillator beam.

FIG. 5 is a schematic of the present invention illustrating the principle of pre-compensation of phase and amplitude aberrations both in a laser amplifier 150 and due to turbulence 180; excluding correction of aberrations in the master oscillator beam 100B. In many cases, the master oscillator beam 100B will have almost no phase aberration. In this case, there is no need for the phase correction and steering devices DM2B/FSM2B 430 or the HEL WFS B 415 as previously illustrated in FIG. 4 and thus eliminated in FIG. 5. In this case, the phase correction and steering devices DM1B/FSM1B 425 are controlled in the conventional manner from the Beacon WFS B 420.

The reason that the configurations in both FIGS. 4, 5 lead to compensation of both amplitude and phase aberrations is that underlying the electro-optical configuration is an iterative process that can be shown to compensate for both amplitude and phase aberrations. The underlying theory is the theory of simultaneous projections onto constraint sets, and is described in past work (references 12; 7; 3; 6; 5). This theory is related to vector space projection methods for iterative solution of problems that can be cast as a collection of convex and non-convex constraint sets.

Figure 6:
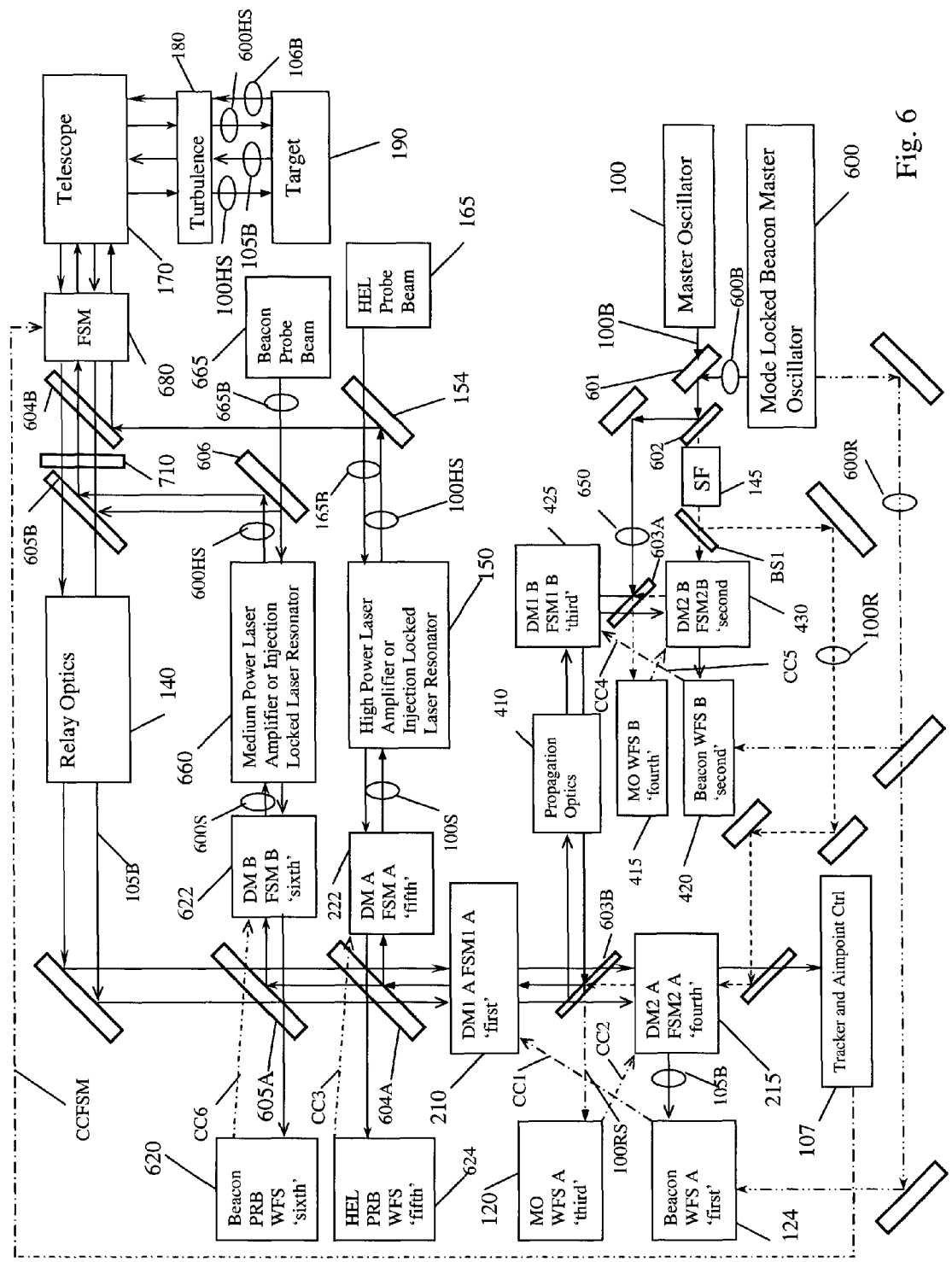
FIG. 6 is a schematic of the present invention illustrating the principle of pre-compensation of phase and amplitude aberrations both in a laser amplifier and due to turbulence; 'including' correction of aberrations in the master oscillator beam and including a preferred embodiment for use with non-cooperative targets and continuous wave or pulsed high energy laser beams where the beacon laser master oscillator is a mode locked short pulse laser and is amplified in a separate beam path.
Figure 7:
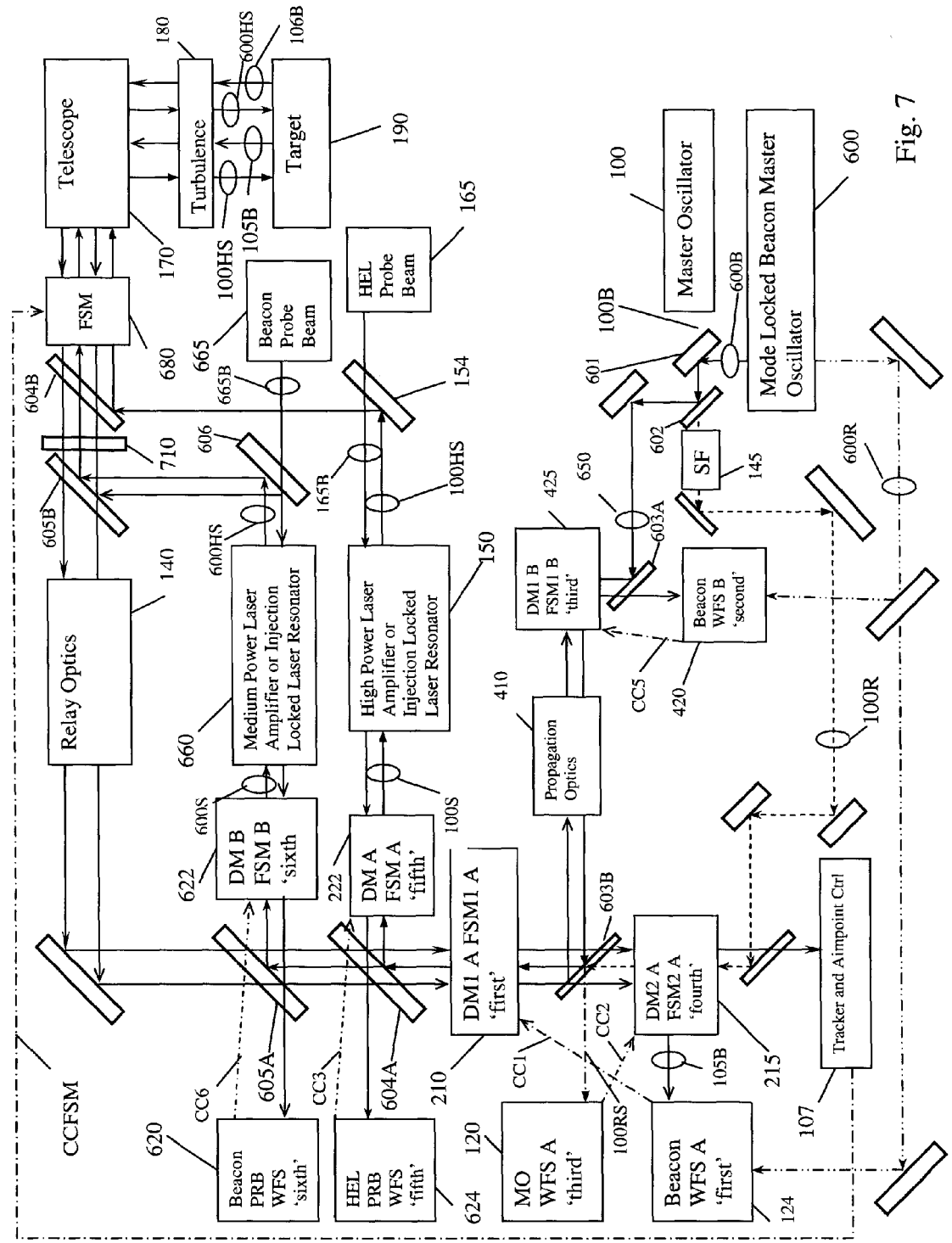
FIG. 7 is a schematic of the present invention illustrating the principle of pre-compensation of phase and amplitude aberrations both in a laser amplifier and due to turbulence; 'excluding' correction of aberrations in the master oscillator beam and including a preferred embodiment for use with non-cooperative targets and continuous wave or pulsed high energy laser beams where the beacon laser master oscillator is a mode locked short pulse laser and is amplified in a separate beam path.
Figure 8:
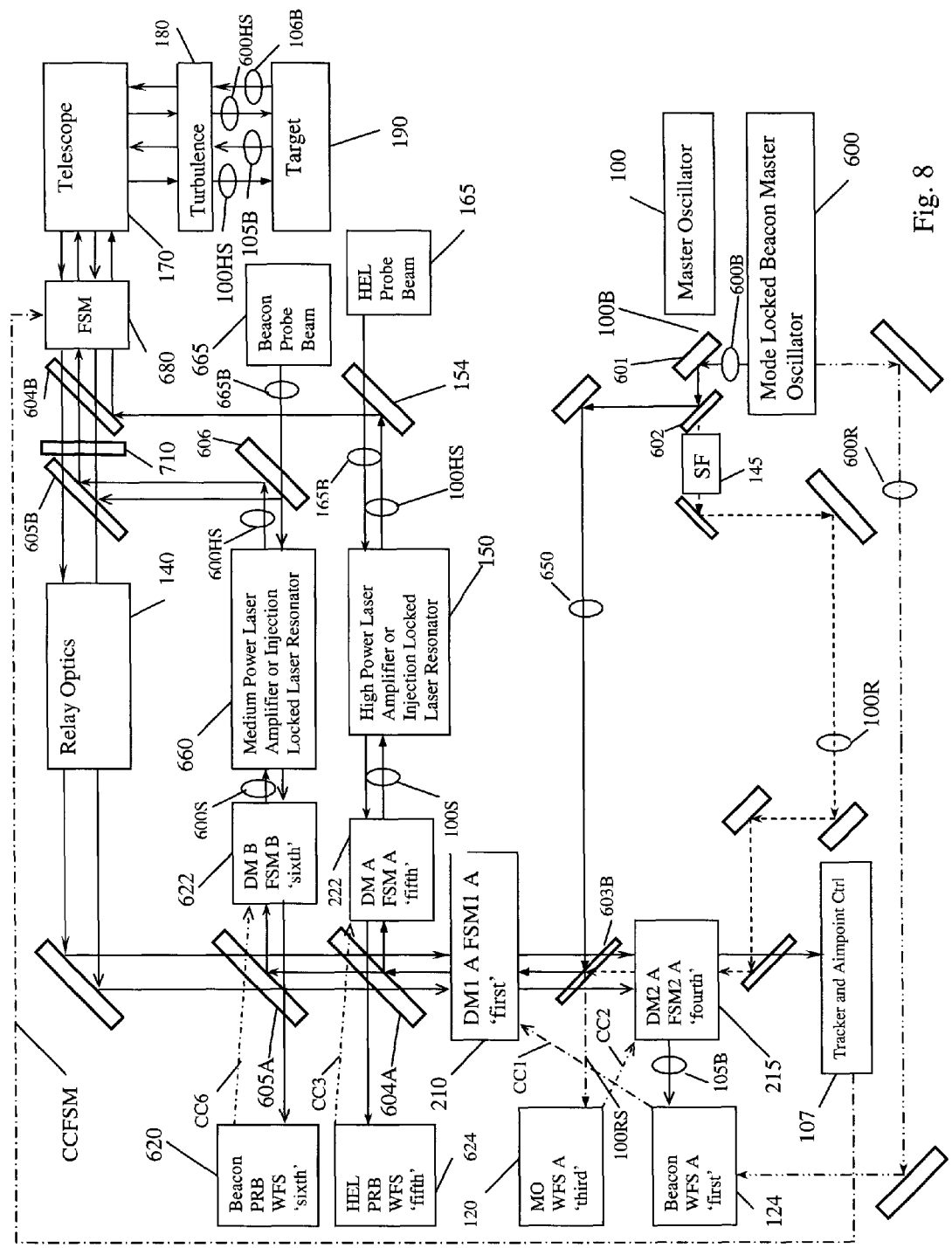
FIG. 8 is a schematic of the present invention illustrating the principle of pre-compensation of phase aberrations both in a laser amplifier and due to turbulence; including correction of aberrations in the master oscillator beam and including a preferred embodiment for use with non-cooperative targets and continuous wave or pulsed high energy laser beams where the beacon laser master oscillator is a mode locked short pulse laser and is amplified in a separate beam path.

The schematics described in FIGS. 1-5 describe valid configurations that cover a wide class of systems. However, the preferred configurations that are most suitable for operation with continuous wave high energy laser systems and non-cooperative targets (the primary application of interest) are illustrated in FIGS. 6-8, with the latter figure illustrating a configuration that provide compensation only for phase aberrations and the former two configurations providing compensation for both phase and amplitude aberrations. A fourth configuration, not shown, is an obvious variation to remove the capacity to compensate for aberrations in the master oscillator beam. All three methods are configured in a manner that provides the best possible signal to noise ratio by use of heterodyne detection and provides for an implementation of the method of Target Feature Adaptive Optics (TFAO), which is a limited case of the more general Broadband Coherent Adaptive Optics (BCAO) (8). The primary distinction in these particular embodiments is that the high energy laser can be either continuous wave or pulsed, but that an additional high energy beam path which is pre-compensated by a phase correction device labeled DM B and fine steering device labeled FSM B pair 622 in a low power beam path is provided for the beacon illuminator laser.

FIG. 6 is a schematic of the present invention illustrating the principle of pre-compensation of phase and amplitude aberrations both in a laser amplifier 150 and due to turbulence 180; 'including' correction of aberrations in the master oscillator beam and including a preferred embodiment for use with non-cooperative targets and continuous wave or pulsed high energy laser beams where the beacon laser master oscillator is a mode locked short pulse laser 600 and is amplified in a separate beam path.

The High Energy Laser (HEL) beam path begins with the Master Oscillator 100, where the Master Oscillator laser provides the master oscillator seed beam 100B (also labeled 100S later in the beam path) which is to be amplified by the High Power Amplifier Laser Amplifier (or Injection Locked Laser Resonator) 150. The master oscillator seed beam 100B is injected onto the same beam path as the beacon seed beam 600B (also labeled 600S later in the beam path) via the aperture sharing element 601. The beacon seed beam is generated by the majority sample of the transform limited mode locked pulsed beacon master oscillator 600 which is assumed to be linearly polarized. The requirements for the laser pulse length are application dependent and specific to the methods of TFAO and BCAO, which are detailed further below. For the purpose of the discussion herein it is sufficient to simply note that relatively short pulse lengths (typically less than 1 nsec and potentially as short as physically possible—i.e. fsec class) are assumed. The aperture sharing element 601 enables sharing the HEL seed beam path and the beacon seed beam path (i.e. it is shown to be highly reflective at the beacon seed beam 600B wavelength and highly transmissive at the master oscillator beam 100B wavelength—but the converse would be acceptable as well with a standard modification to the drawing in FIG. 6).

After the aperture sharing element 601, the shared beam path 650 of the HEL seed beam 100B is and the beacon seed beam 600B is directed to a beam sampling optic 602. This beam sampling optic is highly reflective at the beacon seed beam 600B wavelength and acts as a beam splitter at the master oscillator beam 100B wavelength. The majority sample of the master oscillator beam 100B is directed along the shared beam 650 path. The minority sample of the HEL beam, the master oscillator reference beam 100R, is spatially filtered via the spatial filter optics 145. The spatial filter optics 145 can be one of any number of methods known to those skilled in the art, including use of a single mode fiber or pinhole filter. The master oscillator reference beam 100R is then split into two paths and directed via standard beam splitters and mirrors through the 'second' and 'fourth' correction device pairs DM2B/FSM2B 430 and DM2A/FSM2A 215 respectively to the aperture sharing elements 603A and 603B, respectively.

Returning to the shared beam path 650, this beam is directed to the aperture sharing element 603A, which is highly reflective at the beacon seed beam 600B wavelength and acts as a beam splitter at the master oscillator beam 100B wavelength. The majority of the beam sample of the HEL beam continues on the shared beam path 650, while a minority sample interferes with the master oscillator reference beam 100R and is directed to the 'fourth' HEL WFS B 415 where the interference pattern is used to control the 'second' correction device pair 430 in the same manner as that for the configuration described in FIG. 4.

The shared beam path 650 passes through the propagation optics 410 and to the aperture sharing element 603B, which is highly reflective at the beacon seed beam 600B wavelength and acts as a beam splitter at the master oscillator (MO) beam 100B wavelength. The majority of the beam sample of the MO beam continues on the shared beam path 650, while a minority sample interferes with the MO reference beam 100R and is directed to the 'third' MO WFS A 120 where the interference pattern is used to control the 'fourth' correction device pair DM2A/FSM2A 215 in the same manner as that for the configuration described in FIG. 1. The shared beam path 650 passes through the 'first' correction device pair 210 and to the aperture sharing element 604A, which is highly reflective at the MO beam 100B wavelength and highly transmissive at the beacon beam 600B wavelength. The HEL beam is directed through the 'fifth' correction device pair DMA/FSMA 222 through the high power amplifier (or injection locked laser resonator) 150 to be amplified to form the high power HEL beam 100HS, which in turn is directed to the aperture sharing element 604B, which is highly reflective at the MO beam 100B wavelength and highly transmissive at the beacon beam 600B wavelength. The high power HEL beam 100HS is directed through the FSM 680 and telescope 170, which directs the beam through turbulence 180 to the target 190.

The aberrations in the high power amplifier (or injection locked laser resonator) 150 are measured and corrected using the HEL probe beam 165B, which is generated by the HEL probe beam laser 165. The HEL probe beam 165B operates in the same manner as that described in FIGS. 2-5 by first passing through the high power amplifier (or injection locked laser resonator) 150, then passing through the 'sixth' correction device pair 222, through the aperture sharing element 604A (which is highly transmissive at the probe wavelength), and to the 'fifth' HEL Probe WFS 624. The HEL Probe WFS 624, via control signal CC3, controls the 'fifth' correction device pair DM2/FSM2 222 using standard methods well known to those skilled in the art.

Returning to the aperture sharing element 604A, the beacon beam 600B (also labeled 600S) passes through this optic and is directed to the polarizing beam splitter 605A. It is noted that prior to the polarizing beam splitter 605A, the beacon beam 600B has "S" polarization and thus is reflected from the polarizing beam splitter 605A and directed through the 'sixth' correction device pair DMB/FSMB 622 and then amplified via the medium power (where medium is defined as having sufficient amplification to be used as a beacon beam) amplifier (or injection locked laser resonator) 660 to form the high power beacon beam 600HS. High power beacon beam 600HS reflects off of the aperture sharing element 606 which is highly reflective at the beacon beam 600HS wavelength and highly transmissive at the beacon probe beam 665B wavelength.

The aberrations in the medium power amplifier (or injection locked laser resonator) 660 are measured and corrected using the beacon probe beam 665B, which is generated by the beacon probe beam laser 665. The beacon probe beam 665B operates in the same manner as that described in FIGS. 2-5 by first passing through the medium power amplifier (or injection locked laser resonator) 660, then passing through the 'sixth' correction device pair DMB/FSMB 622, through the polarizing beam splitter 605A (which is highly transmissive at the probe wavelength), and to the 'sixth' Beacon Probe WFS 620. The Beacon Probe WFS 620, via control signal CC6, controls the correction device pair DMB/FSMB 622 using standard methods well known to those skilled in the art.

Returning to aperture sharing element 606, the high power beacon beam 600HS is directed to the polarizing beam splitter 605B where the beacon beam 600HS, which remains "S" polarized, then reflects and is directed through the quarter waveplate 710. The quarter waveplate 710 converts the high power beacon beam 600HS to circular polarization so that after propagating to the target 190 (through the aperture sharing element 604B, FSM 680, telescope 170, and turbulence 180) and back the return beacon beam 106B will be converted back to "P" polarization and will transmit through the polarizing beam splitter 605B. The particulars of target interaction of the pulse are discussed below in the discussion of Target Feature Adaptive Optics (TFAO).

After the return beacon beam 106B transmits through the polarizing beam splitter 605B, the beam is imaged via relay optics 140 so that the return beam has the same longitudinal conjugate plane as the outgoing beacon beam 600B at the plane of the polarizing beam splitter 605A. Because the return beacon beam 106B at this point retains "P" polarization, the return beacon beam 106B transmits through the polarizing beam splitter 605A. The return beacon beam 106B continues through the 'first' correction device pair DM1A/FSM1A 210 and to the aperture sharing element 603B. It is to be noted at this point that aperture sharing element 603B is optimally designed such that it is highly reflective at "S" polarization at the beacon laser 600 wavelength, but roughly 50% transmissive and 50% reflective at the "P" polarization at the beacon laser 600 wavelength (where the transmit to receive ratio at "P" polarization should be optimized depending on the exact system configuration). In so doing, aperture sharing element 603B maximizes outgoing beam throughput on the beacon path, but acts as an appropriate beam splitter on the return path.

The first of the two samples of the return beacon beam 106B is directed through 'fourth' correction device pair DM2A/FSM2A 215 to the 'first' Beacon wavefront sensor WFS A 124. In WFS A 124, the return beam is interfered according to the method of Broadband Coherent Adaptive Optics (BCAO) or Target Feature Adaptive Optics (TFAO) with a local oscillator pulse 600R from the mode locked beacon master oscillator 600 as described in the text below. The second sample of the return beacon beam 106B is directed through the propagation optics 410 and 'third' correction device pair DM1B/FSM1B 425 to aperture sharing element 603A which shares the same properties as aperture sharing element 603B. Noting that the sample of the return beacon beam 106B remains in the "P" polarization state, the beam transmits through the aperture sharing element 603A, and to the 'second' Beacon wavefront sensor WFS B 420 via the 'second' correction device pair DM2B/FSM2B 430, where as with the first sample of the beacon return beam 106B, the beam is interfered according to the method of Broadband Coherent Adaptive Optics (BCAO) or Target Feature Adaptive Optics (TFAO) with a local oscillator pulse beacon reference beam 600R from the mode locked beacon master oscillator 600 as described in the text below.

The majority sample of the mode locked beacon master oscillator 600 was referenced above and traced through the system to the target and back for interference with a minority sample of the mode locked beacon master oscillator 600. The minority sample beam, the beacon reference beam 600R, is directed into a Beacon WFS A 124 for use in heterodyne detection of the received signal. In the case of FIG. 6 the minority sample of the beam 600R is directed into both Beacon WFS A 124 and Beacon WFS B 420 according to the method of Broadband Coherent Adaptive Optics (BCAO) or Target Feature Adaptive Optics (TFAO). This particular configuration assumes that the minority sample of the beam reference beam 600R is actually sampled from a very high repetition rate (order 10 MHz or more) sub-master mode locked beacon master oscillator 600 (this sub-master mode locked beacon master oscillator 600 would serve as a seed laser for an amplifier internal to the device labeled "mode locked beacon master oscillator" 600 which in order to support atmospheric compensation would typically have repetition rates from 5 to 50 kHz—this frame rate is based on requirements for compensation and is not confined to this range of frame rates). Standard heterodyne detection methods can be utilized and multiple approaches can be adopted, but a particular configuration is described below that includes optical delay circuitry to account for the time delay between pulses.

The principle of the real time control algorithm is the same as that for the schematic described in FIG. 4 and the same properties are shared, with the difference being in FIG. 6 that the preferred embodiment has been described which utilizes the method of BCAO or TFAO to form a diffraction limited size beacon beam 600HS at the target 190 along with heterodyne detection to achieve maximum signal to noise ratio and to interferometrically range gate the target aimpoint onto the beacon wavefront sensors WFS A 124 and WFS B 420. As such, the preferred embodiment illustrated in FIG. 6 provides a method that is suitable for non-cooperative targets for pre-compensation of a low power seed beam for aberrations induced by propagation through both turbulence and a high power amplifier.

FIG. 7 is a schematic illustrating the principle of pre-compensation of phase and amplitude aberrations both in a laser amplifier and due to turbulence; 'excluding' correction of aberrations in the master oscillator beam 100B and including a preferred embodiment for use with non-cooperative targets and continuous wave or pulsed high energy laser beams where the beacon laser master oscillator 600 is a mode locked short pulse laser and is amplified in a separate beam path. FIG. 7 is similar to FIG. 6 with the exception that the DM2 B/FSM 2B pair 430 is removed.

FIG. 8 is a schematic illustrating the principle of pre-compensation of phase aberrations both in a laser amplifier and due to turbulence; including correction of aberrations in the master oscillator beam and including a preferred embodiment for use with non-cooperative targets and continuous wave or pulsed high energy laser beams where the beacon laser master oscillator is a mode locked short pulse laser and is amplified in a separate beam path. FIG. 8 is similar to FIG. 7 with the exception that the propagation optics 410, beacon WFS B 420 and DM1B/FSMB pair 425 are removed.

Up to this point the discussion has not detailed methods for processing data and real time control. There are multiple options for real time control and specifics of the application will define the best method. The standard "least squares unwrapping method with branch point addition" combined with the exponential filter control algorithm is likely the most straightforward candidate for implementation (ref. 4; 8). This algorithm would be applied to each control loop. The particulars of design of control coefficients would utilize well known and standard techniques.

The preceding discussion completes the technical description of the ILFCS, providing both a top level conceptual description as well as a more detailed description of a likely preferred configuration. It should be noted that the distinct advantage of the method of the present invention is that all of the phase correction devices can be in lower power beam paths, greatly reducing requirements on a high cost components that also will typically drive the overall size of the beam control system. The ILFCS and its derivative sub-methods represent a revolutionary approach to beam control for propagation of lasers and can be used for a wide range of applications. The ILFCS as described herein is effective for a wide range of cooperative target applications and is effective with non cooperative targets using a pre-compensated beacon laser without the added complexity of heterodyne TFAO or BCAO at modest ranges (typically if the range and turbulence strength is such that the spherical wave Rytov number, R, is less than about 0.7. The Rytov number, R, is defined as:

$$R = 0.5631 \left(\frac{2\pi}{\lambda}\right)^{7/6} \int_0^L dz z^{5/6} \left(1 - \frac{z}{L}\right)^{5/6} C_n^2(z),$$

where $\lambda$ is the wavelength of propagation, z is the slant path variable, L is the propagation slant range, and $C_n^2(z)$ is the refractive index structure constant along the propagation path. It should be noted that by the word "effective" is meant that the ILFCS will achieve performance nearly as good as that for a cooperative point source beacon, but will not quite achieve this full performance due to various error sources that are not avoidable, but are well minimized by the use of a compensated beacon in conjunction with the ILFCS method or its derivative methods.

Figure 9A:
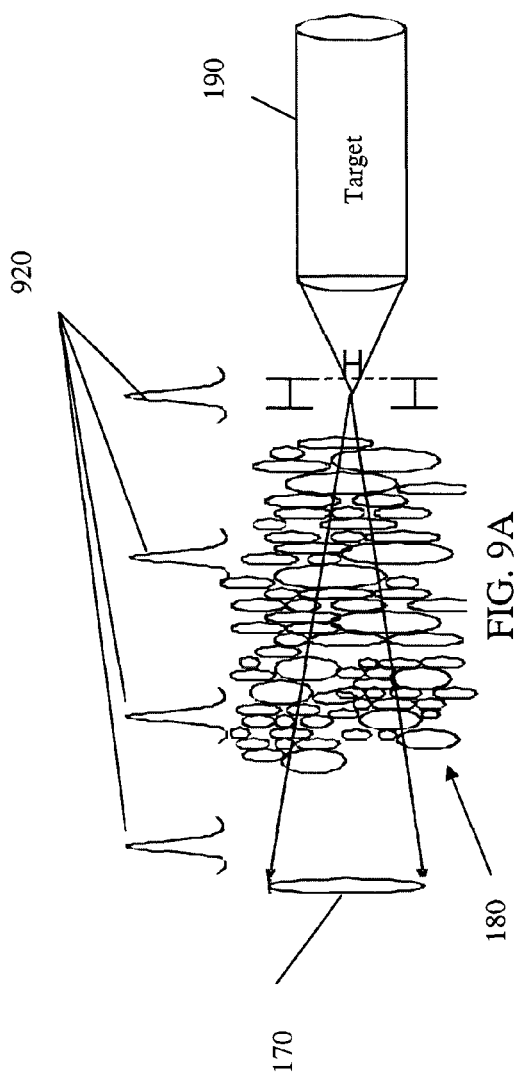
FIG. 9A is a drawing illustrating the principle of Broadband Coherent Adaptive Optics (BCAO), of which Target Feature Adaptive Optics (TFAO) is a special case, using a mode locked master oscillator seed laser which has transform limited pulses.
Figure 9B:
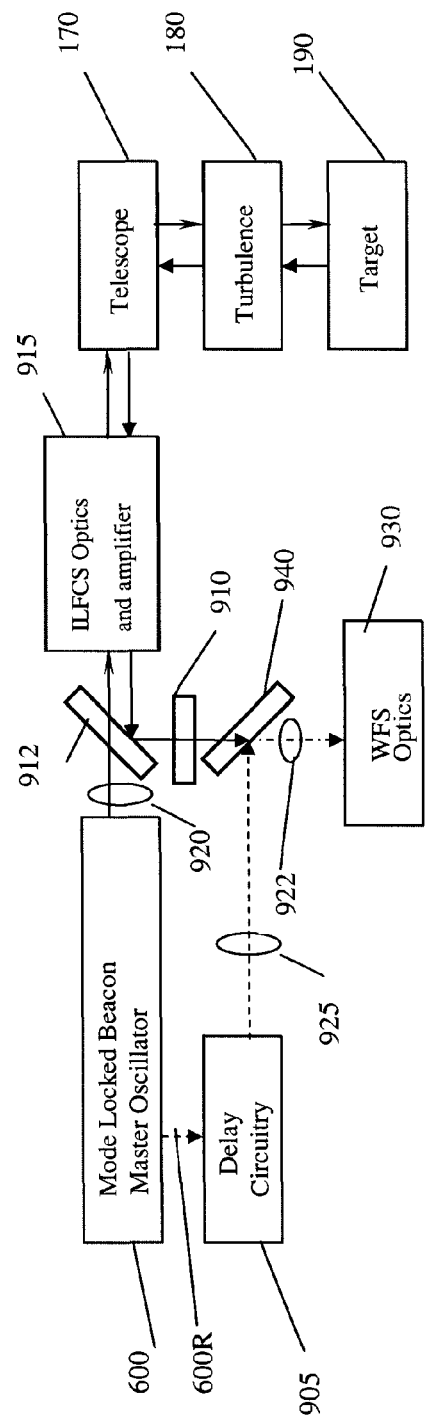
FIG. 9B is a schematic representing the drawing of FIG. 9A and illustrating the principle of Broadband Coherent Adaptive Optics (BCAO), of which Target Feature Adaptive Optics (TFAO) is a special case, using a mode locked master oscillator seed laser which has transform limited pulses.

FIG. 9A is a drawing illustrating the principle of Broadband Coherent Adaptive Optics (BCAO), of which Target Feature Adaptive Optics (TFAO) is a special case, using a mode locked master oscillator seed laser which has transform limited pulses. Shown are telescope 170, turbulence 180, outgoing pulse train 820, pulse delay circuitry 905, and target 190. FIG. 9B below will describe the configuration in more detail.

FIG. 9B is a schematic representing the drawing of FIG. 9A and illustrating the principle of Broadband Coherent Adaptive Optics (BCAO), of which Target Feature Adaptive Optics (TFAO) is a special case, using a mode locked master oscillator seed laser which has transform limited pulses. A reference pulse is interfered with the pulse return from the target to select a precise location on the target 170 for wavefront sensing along the axis of propagation. If the target 170 has depth, then the sub-method of TFAO is adequate, providing reduced spatial extent of the beacon spot formed on the target. If the target is relatively flat then the full method of BCAO is required. In this case, the fringes outside the central core of the spot formed over the bandpass of the ultra short pulse wash out, leading to a near diffraction limited focused spot at the target 170. The previous discussion focused on the particulars of the optical configuration(s) that can be used to achieve pre-compensation of aberrations both in the laser gain medium and for propagation through turbulence. In FIGS. 9-12, is discussed detail on a particular configuration for implementation of a method (ref. 8) to form a diffraction limited size beacon on a non-cooperative target denoted Broadband Coherent Adaptive Optics (BCAO), of which Target Feature Adaptive Optics (TFAO) is a special, but less capable. The particular new configuration described here represents the preferred method to implement BCAO or TFAO.

The basic configuration is illustrated in FIGS. 9A, 9B. The outgoing short beacon pulse train 920 from the mode locked master oscillator 600 having transform limited pulses is transmitted through optic 912 and the ILFCS optics 915 and beam train, through the telescope 170, turbulence 180 and to the target 190 where it reflects back from the target 190 and returns through the turbulence 180, telescope 170, optic 912, ILFCS optics 915, and waveplate 910 at an orthogonal polarization to the original launched beam. This beam is then interfered with a reference pulse train 925 from the mode locked master oscillator 600, with the timing of the delay circuitry 905 controlling the reference pulse 925 to only interfere with the pulse return at optic 940 and becomes composite beam 922 corresponding to a precise location on the target 190 along the axis of propagation of the laser. In so doing, if there are features on the target 190, then the spatial extent of the pulse that actually is used for phase measurement is reduced simply by the target geometry as illustrated in FIG. 9. This provides a small beacon, whose extent is limited by: (1) the length of the pulse; and (2) ensuring that adequate signal to noise is provided. The length of the pulse can be very short—for many typical targets 10-100 psec pulses are adequate although pulse length ranges can be from about 1 picosecond to about 1000 picoseconds. If the target is completely or nearly flat then femtosecond class pulse lengths are required in order to effect the method of Broadband Coherent Adaptive Optics of reference [8]. Adequate signal to noise is provided by use of the local oscillator to boost the interference fringes into the shot noise limit of the detector, providing the maximum possible range, given finite laser power. If the target 190 is near flat or featureless with no depth in the region of interest, then the pulse length must be very short, and ideally should be so short such that fringes outside the central core of the focused beam destructively interfere and wash out all but the central core—forming a nearly diffraction limited spot from the perspective of the wavefront sensor 930. This is the method of BCAO, with TFAO being a less capable subcase (ref. 8).

The wavefront sensor optics are only shown generically in FIG. 9. Two specific example implementations are provided in FIGS. 10, 11.

Figure 10:
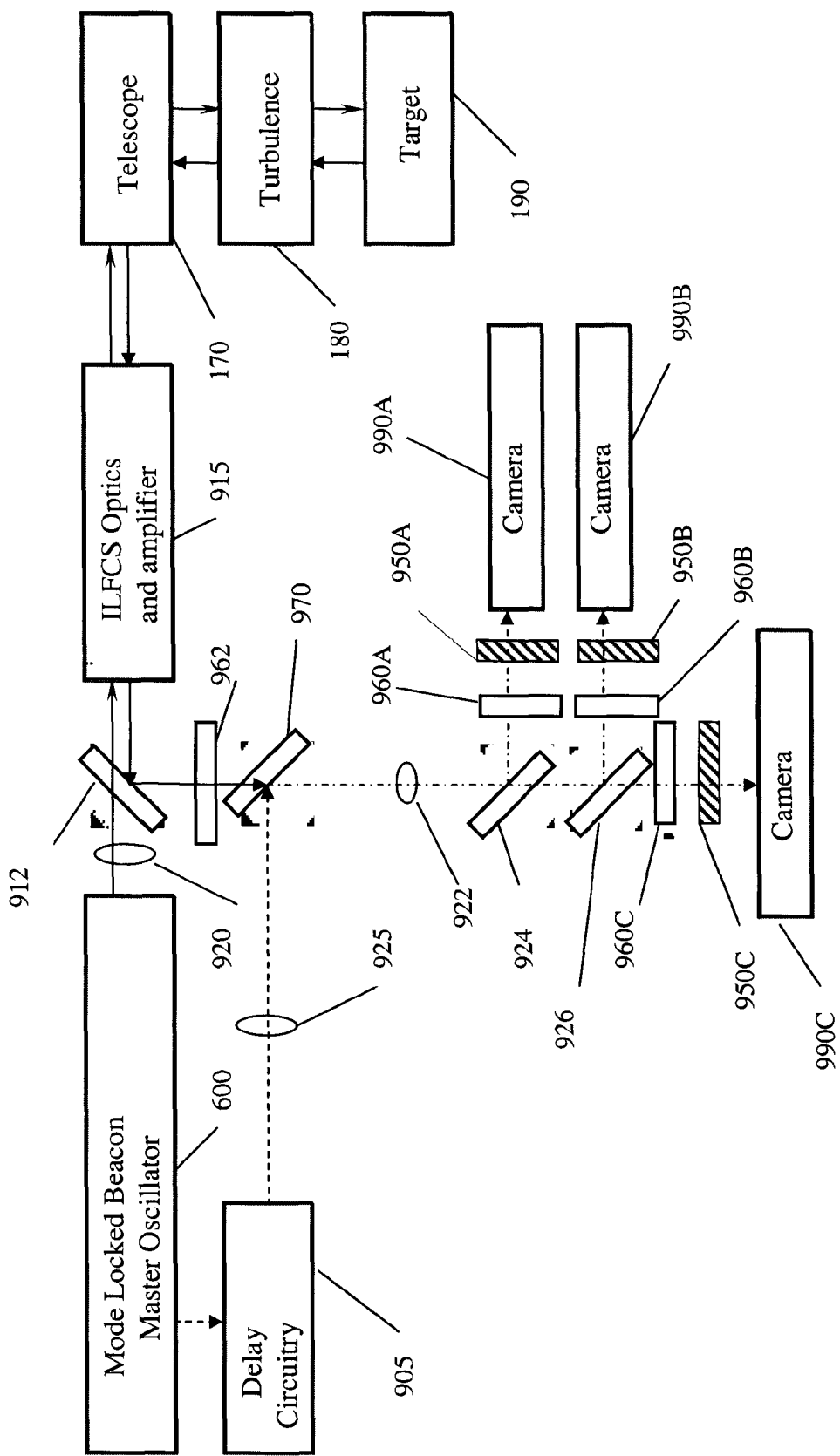
FIG. 10 is a schematic for the wavefront sensor optics for the method of TFAO or BCAO defined in FIG. 9.

FIG. 10 is a schematic for the wavefront sensor optics for the method of TFAO or BCAO defined in FIG. 9. The reference and return pulse are at orthogonal polarizations to one another and thus a properly aligned partial retardance waveplate 962 (aligned to the "s" polarization of the reference pulse train) applies the necessary phase shifts to obtain a 3-bin spatial phase shifting interferometer. FIG. 10 illustrates a purely spatial phase shifting 3-bin interferometer implementation. Non-polarizing approximately 50% beam splitters 924, 926, direct composite beam 922 through waveplates 960A, 960B, 960C and polarizers 950A, 950B, 950C to cameras 990A, 990B, and 990C respectively. The schematic is largely self-explanatory, given knowledge that the reference signal and the return signal are at orthogonal polarizations to one another and that the $\pi/3$ waveplate 960A, $5/3\pi$ waveplate 960B, $\pi$ waveplate 960C associated with each camera 990A, 990B, 990C respectively can be aligned approximately to the minority reference beam polarization state. This first method has the limitation that it wastes roughly half of the signal.

Figure 11:
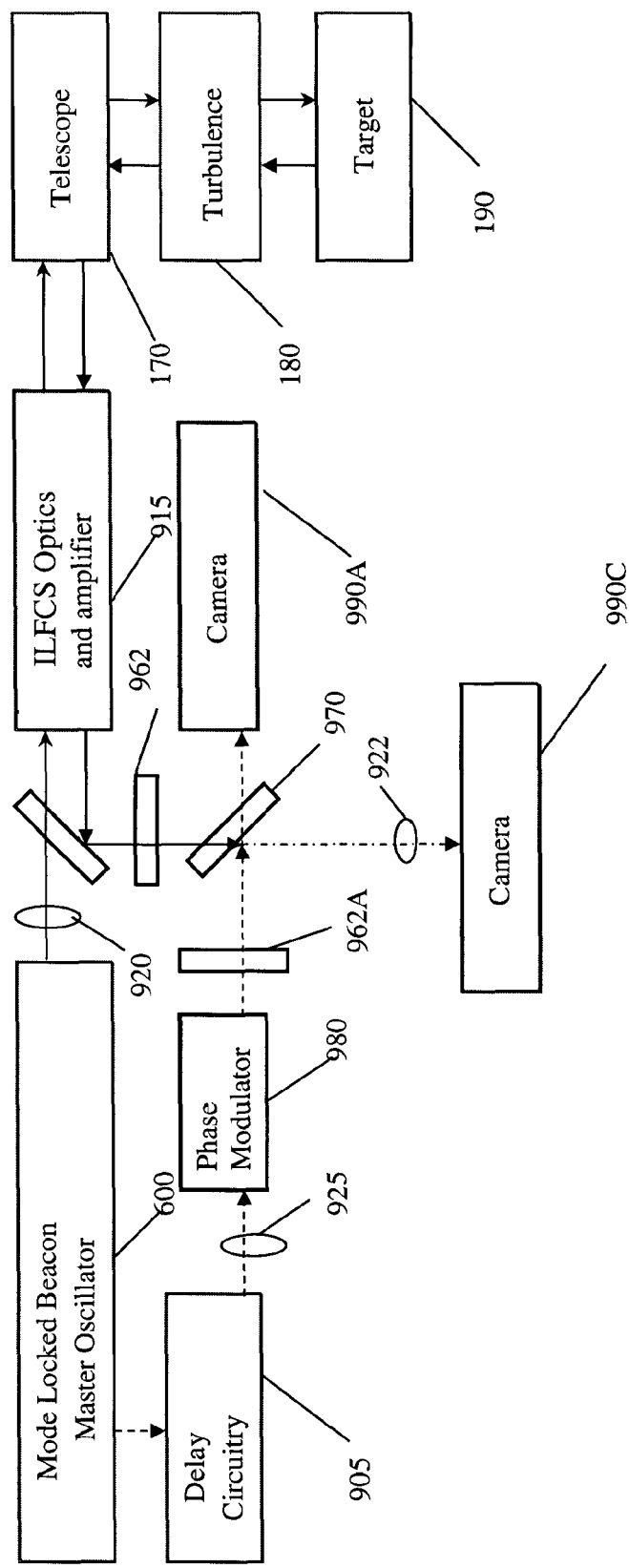
FIG. 11 is a schematic for an alternate sub-optimal implementation of wavefront sensor optics for the method of TFAO or BCAO defined in FIG. 6. The reference and return pulse are at about orthogonal polarizations to one another.

FIG. 11 is a schematic for an alternate sub-optimal implementation of wavefront sensor optics for the method of TFAO or BCAO defined in FIG. 6. The reference and return pulse are at orthogonal polarizations to one another. The use of polarizing splitter 970 and appropriately aligned waveplates 962, 962A provides measurements of the phase with 0 and $\pi$ phase shifts at the detector. The phase modulator 980 is toggled rapidly between 0 and $\pi/2$, with the latter position providing $\pi/2$ and $3\pi/2$ phase shift measurements at the detectors. In this configuration, two phase shift measurements are obtained for a given pulse return, with a second pair obtained at alternating pulse returns. The first pair obtained would correspond to 0 and $\pi$ phase shift measurements, while the second pair obtained would correspond to $\pi/2$ and $3\pi/2$ phase shift measurements by applying a $\pi/2$ phase shift to the reference beam path 925 on alternating pulses. There is a performance degradation due to this method if the piston phase of the return signal or the reference signal varies significantly from pulse to pulse (a likely scenario).

Figure 12:
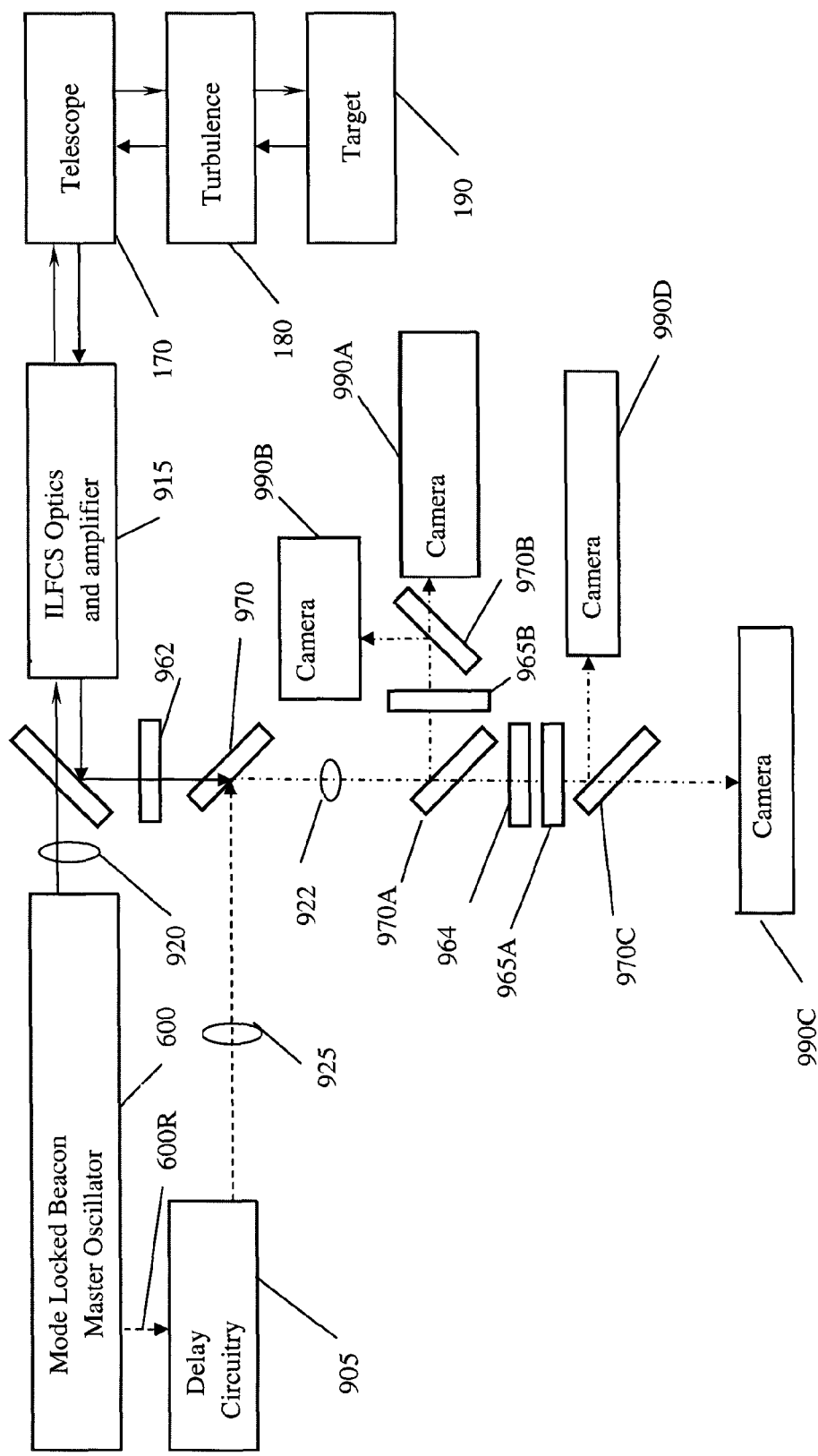
FIG. 12 is a schematic of the preferred implementation for the wavefront sensor optics for the method of TFAO or BCAO defined in FIG. 6. The reference and return pulse are at orthogonal polarizations to one another and the diagram here forms a 4-bin spatial phase shifting interferometer.

FIG. 12 is a schematic of the preferred implementation for the wavefront sensor optics for the method of TFAO or BCAO defined in FIG. 6. The reference and return pulse are at orthogonal polarizations to one another and the diagram here forms a 4-bin spatial phase shifting interferometer. Given that the method in FIG. 10 wastes roughly half of the signal (but would be a viable solution) and given that the configuration in FIG. 11 likely will have poor performance due to pulse to pulse variations in the piston of the return or reference pulse, the preferred implementation is depicted in FIG. 12. In this method showing half waveplates 962, 965A, and 965B, quarter waveplate 964, polarizing splitters 970, 970B, and 970C, and non-polarizing approximately 50% beam splitter 970A, there is no wasted light, providing the best possible signal to noise ratio. Although illustrated with four cameras 990A, 990B, 990C, 990D, the selection of 1, 2, or 4 cameras would be subject to engineering and implementation trades (maximum speed would be obtained with 4 cameras, but this will lead to a more expensive and larger system).

Thus, referring to FIGS. 6, 9, 12, the preferred embodiment of the present invention would consist of the following for projection of laser beams through a turbulent medium to a non-cooperative target:

1) a master oscillator beam 100B having an optical path to a high power laser amplifier 150 or injection locked laser amplifier forming a high energy laser (HEL) beam to a target 190 via an optical path including a steering mirror 680 and a telescope 170;

2) a mode locked beacon master oscillator 600 that produces a majority sample high repetition rate (ranging from about 100 to 100000 Hz) sequence of transform limited pulsed laser beams and a minority reference beam has a repetition rate defined by the cavity length of the mode locked oscillator (ranging typically from MHz to GHz);

3) a timing delay circuit 905 which receives the reference beam 600R and produces a delayed reference beam 925 that is delayed to coincide with the arrival of the return beacon signal pulse from the target aimpoint along the propagation path axis;

4) the majority high repetition rate beacon beam transmitted via an optical path to a medium power amplifier 660 which sends a beacon beam via an optical path to the target 190;

5) the high repetition rate reflected (return) beacon pulse train beam returns from the target 190 through the turbulent medium 180, telescope 170, optical path, and a quarter waveplate 710 in the optical path, then passes through a first polarizing wave splitter optic 605A and is then directed to a first beacon wave front sensor (WFS) 124 where it is combined and subsequently interfered with the reference beam 600R for phase measurement;

6) the first WFS controlling a first phase correction and steering device pair 210 which (1) corrects the majority beacon beam with respect to phase aberrations caused by propagation through the turbulent medium 180 and (2) provides phase commands to the first correction and steering device pair 210 that will result in correction of amplitude aberrations in the beacon beam caused by propagation through the turbulent medium;

7) a tracker and aim point controller 107 which receives an image of the target, thereby generating a control signal CCFSM to control the steering mirror 680;

8) the minority beacon beam further comprising a segment which goes to a second beacon WFS 420 which also receives a segment of the return beacon beam 105B after said return beacon beam passes through a further propagation optics and a third and second correction and steering device pair 425, 430;

9) the second beacon WFS 420 controlling a third correction and steering device pair 425 corrects for remaining aberrations in the beacon beam, resulting in correction of both amplitude and phase aberrations caused by propagation through the turbulent medium;

10) a third WFS 120 receives a sample beam from the minority master oscillator beam to compare to a sample of the majority master oscillator beam after it passes through an optical path including a propagation optics and the third correction and steering device pair and controls a fourth correction and steering device pair 215 for aberrations induced by propagation through the third phase correction and steering device pair 425 and propagation optics 410;

11) a fourth WFS 415 receives a sample of the majority master oscillator beam and a minority master oscillator beam after it passes through a spatial filter optic 145 and the second correction and steering device pair 430 and controls a second phase correction and steering device pair 430 for aberrations in the master oscillator 100;

12) a fifth WFS 624 receiving a HEL amplifier probe beam 165B after it passes through the HEL amplifier 150, controls a fifth correction and steering device pair 222.

The methods shown above in FIGS. 10, 11, 12, are shown by way of example and not of limitation as these are not the only three methods that could be utilized. There are many approaches suitable for optimal implementation. For example, if the camera integration time and trigger time could be controlled to sub-psec levels, then a heterodyne approach would not be required. The heterodyne approach is required to enable control over the depth of the target of the location of the pulse return given currently available camera technology. New developing so-called time-of-flight cameras could enable non-heterodyne approaches, however, the signal to noise ratio is likely best for a heterodyne approach, regardless. The combination of a time-of-flight camera with the heterodyne approach is many years from current technology, but would provide the best possible signal to noise ratio and performance, given a specific detector read noise by reducing background shot noise.

As a final point, if the master oscillator for the beacon laser is carrier envelope phase stabilized (a mode locked laser may still have drift in the carrier envelope phase), then multiple pulses can be integrated in a single detection. The requirement for carrier envelope phase stabilization in this case would be that the carrier envelope phase be stable over the length of the integration time. The advantage of taking this approach would be that a higher repetition rate laser could be utilized, reducing the peak power of the illuminator pulses, and thus reducing demand on optical coatings in the system and minimizing the probability of non-linear propagation effects becoming significant.

Note that requirements on the optical delay circuitry are driven not by the round trip time of flight, but rather on the combination of the round trip time of flight and the high repetition rate sub-master oscillator. The repetition rate of these devices is typically in the 100 MHz class, and thus the longest possible time of flight that must be adjusted is the delay time between pulses. A binary fiber circuit with multiple length delay lines combined with a piston mirror or electro-optic phase modulator would provide control from coarse to very fine. This would not be a difficult or complex system to develop and would be readily developed by many potential companies given target state data with accuracy consistent with requirements for aimpoint precision.

Figure 13:
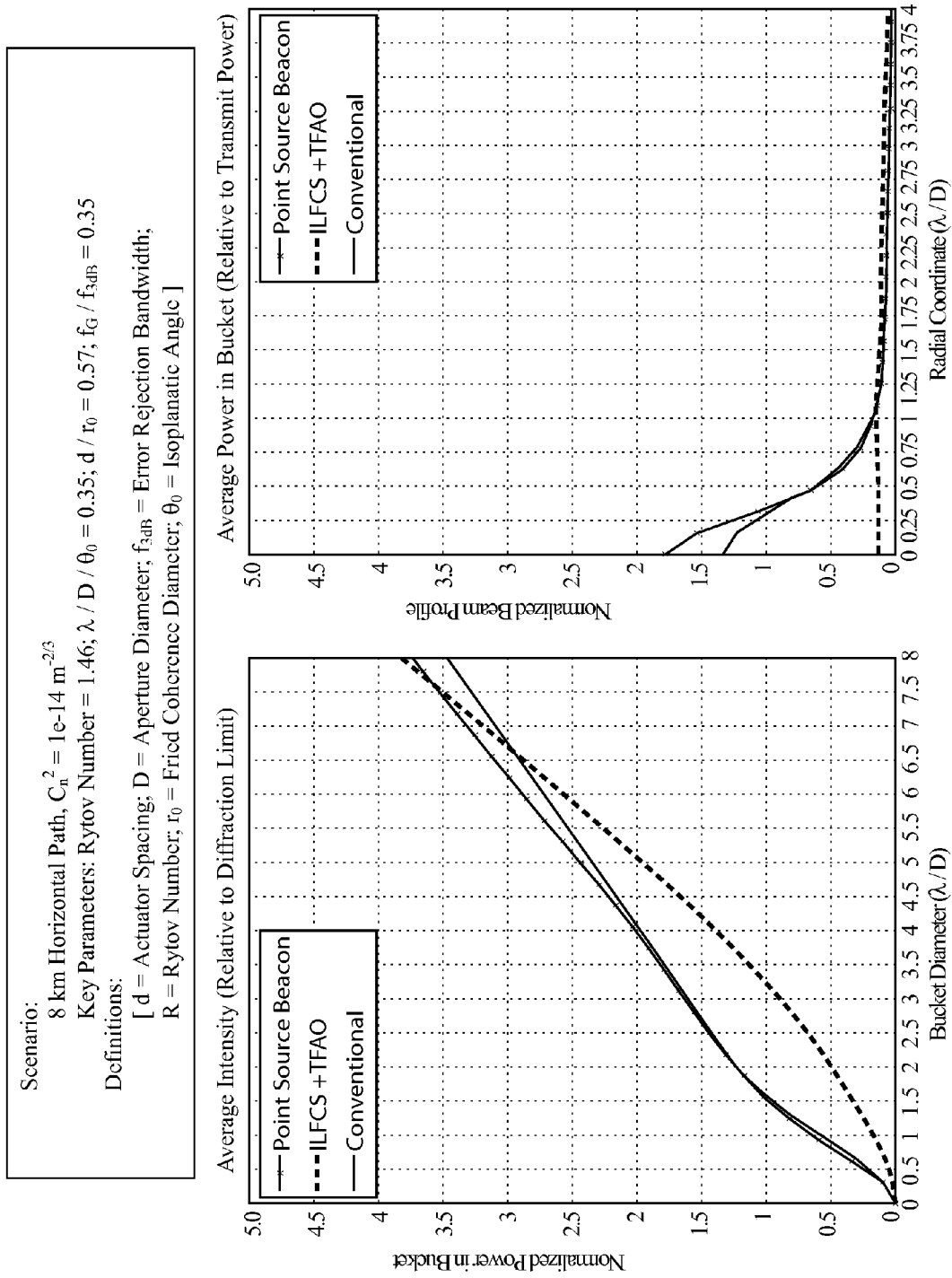
FIG. 13 is a chart showing beam profile and cumulative power in the bucket as a function of bucket diameter and a refractive index.

FIG. 13 is a chart showing the normalized beam profile and normalized cumulative power in the bucket as a function of bucket diameter and a refractive index. Shown as an example is a beam profile and cumulative power in the bucket as a function of bucket diameter for an 8 km horizontal path with a uniform distribution of the strength of turbulence and a refractive index structure constant, $C_n^2 = 1e-14\ m^{-2/3}$. Performance of the ILFCS with TFAO is an order of magnitude improved relative to conventional techniques—and the performance using ILFCS with TFAO is equivalent to that achieved using a point source beacon (where a point source beacon would be the optimal beacon). The ILFCS of the present invention has been simulated for a range of applications. A significant performance improvement over conventional techniques due to the ILFCS is consistently observed. The majority of the benefit is due to the use of BCAO/TFAO.

The benefits of the laser aberration pre-compensation aspect of the ILFCS are primarily associated in reduction of size, weight, and power of the beam control and overall system. The performance shown does not reach the fitting error limit due to losses due to servo lag (inadequate correction speed for this particular example) and due to fundamental limitations, but results in an order of magnitude performance improvement over conventional techniques.

The ILFCS offers tremendous enabling potential for a broad range of applications. Eliminating the requirement that the phase correction device be in the high power beam path offers significant reductions in size, weight, and power handling of the system and eliminates the risk associated with equipping a system with a high energy laser with a phase correction device that could be damaged or destroyed by the high energy laser. The ILFCS is likely most compatible with solid state lasers in a master oscillator power amplifier configuration in the near term, but over time may be proven to be more compatible with unstable resonators using injection locking and/or using the unstable resonator geometry simply as a multi-pass amplifier.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. An electro-optical system for projection of laser beams through a turbulent medium to a non-cooperative target, the system comprising:
   a) a master oscillator beam having a first optical path to an amplifier means;
   b) said amplifier means forming a high energy laser (HEL) beam to a target via a second optical path;
   c) said second optical path including a steering mirror and a telescope;
   d) a mode locked beacon master oscillator that produces a majority beacon beam comprising a high repetition rate (ranging from about 100 to 100000 Hz) sequence of transform limited pulsed laser beams and producing a minority reference beam that has a repetition rate defined by the cavity length of the mode locked beacon master oscillator (ranging typically from MHz to GHz);
   e) wherein a timing delay circuit receives the minority reference beam and produces a delayed reference beam that is delayed to coincide with an arrival of a return beacon beam from a target aimpoint along a propagation path axis;
   f) said majority beacon beam transmitted via a third optical path to a medium power amplifier means which sends the majority beacon beam via a fourth optical path to the target;
   g) wherein said return beacon beam comprising a high repetition rate pulse train beam returns from the target through the turbulent medium, telescope, a fifth optical path, and an about quarter waveplate in the fifth optical path, then passes through a first polarizing wave splitter optic;
   h) wherein the return beacon beam is then directed to a first beacon wave front sensor (WFS) where it is combined with the minority reference beam to form a composite beam for phase measurement;
   i) said first WFS controlling a first phase correction and steering device pair which (1) corrects the majority beacon beam with respect to phase aberrations caused by propagation through the turbulent medium and (2) provides phase commands to the first phase correction and steering device pair that will result in correction of amplitude aberrations in the beacon beam caused by propagation through the turbulent medium;

j) a tracker and aim point controller which receives an image of the target from an illumination source to generate a control signal to control a steering mirror;

k) a third WFS receives a sample beam from the minority reference beam after it passes through a spatial filter optic and the fourth correction and steering device pair to compare to a sample of the majority beacon beam after it passes through a sixth optical path including a propagation optics and the third correction and steering device pair;

l) said third WFS also receives a HEL amplifier probe beam after it passes through the amplifier means to interfere with a sample probe beam from the HEL amplifier probe; and m) said third WFS controlling a fourth correction and steering device pair to correct for aberrations in the master oscillator and amplifier means.

2. The system of claim 1, wherein the first and fourth pair of phase correction and steering device pairs are about optically conjugate to one another.

3. The system of claim 1, wherein the return beacon beam is formed as a cooperative beacon located at the target and pointed toward the transmitting HEL optical path.

4. The system of claim 1, wherein the return beacon beam is formed as an illuminator beam launched from an auxiliary telescope to illuminate the target, and the reflection from the target serves as the beacon beam.

5. The system of claim 1, wherein the return beacon beam is a solar illumination of the target.

6. The system of claim 1, wherein the return beacon beam is a thermal emission of the target.

7. The system of claim 1, wherein the medium power amplifier means is an injection locked laser resonator.

8. The system of claim 1, wherein the image of the target is formed as a cooperative beacon located at the target and pointed toward the transmitting HEL optical path.

9. The system of claim 1, wherein the image of the target received by the aim point controller is either a passive or active illumination of the target.

10. The system of claim 1, wherein a sixth WFS receives a beacon amplifier probe beam after it passes through a beacon medium power amplifier and also receives a sample beam from the beacon amplifier probe beam.

11. The system of claim 1, wherein the sixth WFS controls a sixth correction and steering device pair.

12. The system of claim 1, wherein the amplifier means is a high power laser amplifier.

13. The system of claim 1, wherein the amplifier means is an injection locked laser amplifier.

14. The electro-optical system of claim 1, wherein a first part of the composite beam is directed to an about half waveplate that rotates the polarization of the composite beam by about 45 degrees and then to a polarizing beam splitter that directs a resultant interference patterns to a first and second camera with the resulting measurements being used to compute an estimate of a real part of a measured complex field of the return beacon beam.

15. The electro-optical system of claim 1, wherein a second part of the composite beam is directed first to an about quarter waveplate with its crystal axis approximately aligned to the polarization axis of the minority reference beam and then to an about half waveplate that rotates the polarization of the composite beam by about 45 degrees and then to a polarizing beam splitter that directs the resultant interference patterns to a third and fourth camera with the resulting measurements being used to compute an estimate of an imaginary part of a measured complex field of the return beacon beam.

16. The electro-optical system of claim 1, wherein the minority reference beam and the return beacon beam are at about orthogonal polarizations to one another.

17. The electro-optical system of claim 1, wherein the first WFS consists of an about $\pi/3$ waveplate, an about $5/3\pi$ waveplate, and an about $\pi$ waveplate each associated with a separate camera and can be aligned approximately to the axis of polarization of the minority reference beam.

18. An electro-optical system for projection of laser beams through a turbulent medium to a non-cooperative target, the system comprising:

a) a mode locked beacon master oscillator that produces a majority beacon beam comprising a high repetition rate (ranging from about 100 to 100000 Hz) sequence of transform limited pulsed laser beams (a beacon beam) and producing a minority reference beam that has a repetition rate defined by the cavity length of the mode locked beacon master oscillator (ranging typically from MHz to GHz);

b) said majority beacon beam having a first optical path to an amplifier means;

c) said amplifier means forming a high energy laser (HEL) beam to a target via a second optical path;

d) said second optical path including a steering mirror and a telescope;

e) wherein a timing delay circuit receives the minority reference beam and produces a delayed reference beam that is delayed to coincide with an arrival of a return beacon beam from a target aimpoint along a propagation path axis;

f) said majority beacon beam transmitted via a third optical path to a medium power amplifier which sends the majority beacon beam via fourth optical path to the target;

g) wherein a return beacon beam comprising a high repetition rate pulse train beam returns from the target through the turbulent medium, telescope, fifth optical path, and an about quarter waveplate in the fifth optical path, then passes through a first polarizing wave splitter optic;

h) wherein the return beacon beam is then directed to a first beacon wave front sensor (WFS) where it is combined with the minority reference beam to form a composite beam for phase measurement;

i) said first WFS controlling a first phase correction and steering device pair which (1) corrects the beacon beam with respect to phase aberrations caused by propagation through the turbulent medium and (2) provides phase commands to the first phase correction and steering device pair that will result in correction of amplitude aberrations in the beacon beam caused by propagation through the turbulent medium;

j) a tracker and aim point controller which receives an image of the target from an illumination source to generate a control signal to control a steering mirror;

k) a third WFS receives a sample beam from the minority mode locked beacon master oscillator beam after it passes through a spatial filter optic and the fourth correction and steering device pair to compare to a sample of the majority mode locked beacon master oscillator beam after it passes through a sixth optical path including a propagation optics and the third correction and steering device pair;

l) said third WFS also receives a HEL amplifier probe beam after it passes through the amplifier means to interfere with a sample probe beam from the HEL amplifier probe; and m) said third WFS controlling a fourth correction and steering device pair to correct for aberrations in the mode locked beacon master oscillator beam and high power amplifier.

19. The system of claim 18, wherein the first and fourth pair of phase correction and steering device pairs are about optically conjugate to one another.

20. The system of claim 18, wherein the image of the target is formed as a cooperative beacon located at the target and pointed toward the transmitting HEL optical path.

21. The system of claim 18, wherein the image of the target received by the aim point controller is either a passive or active illumination of the target.

22. The system of claim 18, wherein the amplifier means is a high power laser amplifier.

23. The system of claim 18, wherein the amplifier means is an injection locked laser amplifier.

24. The electro-optical system of claim 18, wherein a first part of the composite beam is directed to an about half waveplate that rotates the polarization of the composite beam by about 45 degrees and then to a polarizing beam splitter that directs a resultant interference patterns to a first and second camera with the resulting measurements being used to compute an estimate of a real part of a measured complex field of the return beacon beam.

25. The electro-optical system of claim 18, wherein a second part of the composite beam is directed first to an about quarter waveplate with its crystal axis approximately aligned to the polarization axis of the minority reference beam and then to an about half waveplate that rotates the polarization of the composite beam by about 45 degrees and then to a polarizing beam splitter that directs the resultant interference patterns to a third and fourth camera with the resulting measurements being used to compute an estimate of an imaginary part of a measured complex field of the return beacon beam.

26. The electro-optical system of claim 18, wherein the minority reference beam and the return beacon beam are at about orthogonal polarizations to one another.

27. The electro-optical system of claim 18, wherein the first WFS consists of an about $\pi/3$ waveplate, an about $5/3\pi$ waveplate, and an about $\pi$ waveplate each associated with a separate camera and can be aligned approximately to the minority reference beam polarization state.

* * * * *